US012677993B2

(12) United States Patent
Ahn et al.

(10) Patent No.: US 12,677,993 B2
(45) Date of Patent: Jul. 14, 2026

(54) VACUUM BLENDER HAVING FOREIGN BODY CATCHING MEMBER MOUNTED THEREON AND FOREIGN BODY CATCHING MEMBER FOR VACUUM BLENDER

(71) Applicants: Joung Geun Ahn, Ansan-si (KR); Byung Hyun An, Ansan-si (KR); Se Hee An, Ansan-si (KR); Kyung Soon Kim, Ansan-si (KR)

(72) Inventors: Joung Geun Ahn, Ansan-si (KR); Byung Hyun An, Ansan-si (KR); Se Hee An, Ansan-si (KR); Kyung Soon Kim, Ansan-si (KR)

( * ) Notice: Subject to any disclaimer, the term of this patent is extended or adjusted under 35 U.S.C. 154(b) by 296 days.

(21) Appl. No.: 18/510,615

(22) Filed: Nov. 15, 2023

(65) Prior Publication Data

US 2024/0090707 A1 Mar. 21, 2024

Related U.S. Application Data

(63) Continuation of application No. PCT/KR2022/007148, filed on May 19, 2022.

(51) Int. Cl.
*A47J 43/07* (2006.01)
*A47J 43/046* (2006.01)

(52) U.S. Cl.
CPC ......... *A47J 43/0716* (2013.01); *A47J 43/046* (2013.01)

(58) Field of Classification Search
CPC .. A47J 43/046; A47J 43/0716; A47J 43/0722; A47J 43/075; A47J 43/0761
See application file for complete search history.

(56) References Cited

FOREIGN PATENT DOCUMENTS

| | | | | | |
|---|---|---|---|---|---|
| KR | 20150145163 | A | * | 12/2015 | ............ A47J 43/046 |
| KR | 20190019690 | A | * | 2/2019 | .......... A47J 43/0716 |
| KR | 102102978 | B1 | * | 4/2020 | .......... A47J 43/0727 |
| KR | 20210048914 | A | | 5/2021 | |

OTHER PUBLICATIONS

Translation of KR-102102978.*
Translation of KR-20150145163.*
Translation of KR-20190019690.*
International Search Report of PCT Patent Application No. PCT/KR2022/007148 issued on Sep. 8, 2022.

* cited by examiner

*Primary Examiner* — Bobby Yeonjin Kim

(57) ABSTRACT

A vacuum blender having a foreign body catching member mounted thereon, the foreign body catching member disposed outside a container cover such that one end is communicatably coupled to a discharge hole formed in the container cover, and the other end is communicatably coupled to a communication path enabling a vacuum pump to communicate with the container cover. When the vacuum pump is operated in a state where the two ends of the foreign body catching member are communicating with the discharge hole and the communication path, respectively, air inside a crushing container is discharged to the outside by passing through the vacuum pump via the discharge hole, the foreign body catching member, and the communication path, and, by means of moving relative to the container cover, the foreign body catching member disposed outside the container cover has the one end communicate with or be blocked from the discharge hole.

18 Claims, 15 Drawing Sheets

(a)

(b)

(a)

(b)

(a)

(b)

(a)

(b)

VACUUM BLENDER HAVING FOREIGN BODY CATCHING MEMBER MOUNTED THEREON AND FOREIGN BODY CATCHING MEMBER FOR VACUUM BLENDER

CROSS REFERENCE TO RELATED APPLICATIONS

The present application is a Continuation application of PCT Application No. PCT/KR2022/007148 filed on May 19, 2022, which claims the benefit of Korean Patent Application Nos. 10-2021-0065118 filed on May 20, 2021 and 10-2021-0165582 filed on Nov. 26, 2021. All the above are hereby incorporated by reference in their entirety.

TECHNICAL FIELD

The present disclosure relates to a vacuum blender having a foreign body catching member mounted thereon and a foreign body catching member for a vacuum blender, and particularly, to a vacuum blender having a foreign body catching member mounted thereon which, when the vacuum blender is operating, prevents micro food particles or moisture from flowing backwards and entering a vacuum pump, and carries out a vacuum operation and crushing operation simultaneously, thereby enabling the operation time to be reduced, and a foreign body catching member for a vacuum blender.

BACKGROUND ART

A blender (mixer), which is one of electronic products that are most generally used at home today, is a machine enabling a user to put food such as fruits, vegetables, and grain into a mixer container and then crush the food using rotary blades rotatably installed on the bottom in a storage container for eating.

Since common blenders simply crush food put in a storage container, foam and bubbles are generated due to mix with air in a crushing process, which deteriorates texture and destroys nutrients.

Further, when a user doesn't immediately eat the food but needs to store it after crushing, the food is stored in a state exposed to the air to stimulate an oxidation process more quickly, so destruction of fibroid materials and nutrients accelerates, the color changes and freshness is deteriorated, and layer separation occurs between the air and the food.

As described above, there is a problem that it is difficult to store food crushed by a blender for a long period of time if not immediately taking the food.

In order to make up for such a defect of existing common blenders, recently, vacuum blenders having various structures are being developed and released.

According to vacuum blenders, when liquid food is put and crushed in a crushing container, micro food particles flow into a vacuum pump due to vacuum suction force, etc., so the vacuum pump and a pressure sensor are often broken.

In order to prevent this problem, most products are set to control the pressure inside a crushing container on the basis of time without a pressure sensor by calculating the pressure in advance, so the vacuum time is set to be uniformly the same regardless of the amount of contents.

Further, in the vacuum blenders of the related art, the crushing containers cannot be fully filled with food (liquid, etc.) and are configured to collect and crush food of only about 40% of the size of the crushing containers, so the efficiency of the vacuum blender is low.

In order to solve the problem of inflow of microparticles, a structure that prevents micro food particles from flowing backwards end entering a vacuum pump by mounting an anti-backflow unit (a foreign body catching member, etc.) at the lower portion of a container cover has been proposed in Korean Patent Application Publication No. 10-2019-0019690, etc.

However, in the case of mounting an anti-backflow unit at the lower portion of a container cover, there is a limitation in size, so the amount of microparticles that can be collected is small and assembly is difficult. In particular, when the contents (microparticles) flow backwards, washing is difficult at common home, so mold grows inside a vacuum hose after a long-time use, which causes many problems in terms of sanitation.

Further, when vacuum operation and crushing operation are both performed in a crushing container, moisture or microparticles flow into a vacuum pump and a pressure sensor due to vacuum pressure and the vacuum pump and pressure sensor break. Accordingly, in order to prevent this problem, in the related art, vacuum operation for the inside of a crushing container is performed first by a vacuum pump and crushing operation by blades is performed after vacuum operation.

Accordingly, since a time for vacuum operation and crushing operation are separated in the related art, the operation time of vacuum blenders is increased, so many customers complain that the operation time of vacuum blenders is long.

Further, in the related art in which a foreign body catching member is mounted, a hole communicating with the inside of the foreign body catching member is formed on the inner circumferential surface of a mounting hole in which the foreign body catching member is mounted, so there is difficulty in washing, etc.

SUMMARY OF INVENTION

Technical Problem

The present disclosure has been made in an effort to solve the problems described above, and an objective of the present disclosure is to provide a vacuum blender having a foreign body catching member, the vacuum blender enabling a foreign body catching member to be easily assembled and cleaned because the foreign body catching member is mounted outside a crushing container rather than at the lower portion of a container cover, making it possible to manufacture a foreign body catching member in a large size, being able to prevent breakdown of a vacuum pump or a pressure sensor due to backflow of microparticles, which are produced when food is crushed, even though vacuum operation and crushing operation are performed together when crushing food in the crushing container, making it possible to remarkably reduce an operation time because vacuum operation and crushing operation are performed together, and making it easy to clean the portion communicating with the foreign body catching member and a foreign body catching member for a vacuum blender.

Solution to Problem

In order to achieve the objectives, a vacuum blender having a foreign body catching member of the present disclosure includes: a body equipped with a motor and a vacuum pump; a crushing container coupled to the body and having a mixing space therein in which food is received; a container cover coupled to an upper portion of the crushing container, covering an upper portion of the mixing space, and having a discharge hole formed therethrough; a communication path enabling the vacuum pump and the discharge hole of the container cover to communicate with each other; and a foreign body catching member having one end communicating with the discharge hole and the other end communicating the communication path, and having a chamber therein in which microparticles that are produced when food is crushed are collected through the discharge hole, wherein the foreign body catching member is disposed outside the container cover, and when the vacuum pump is operated in a state where the one end and the other end of the foreign body catching member are communicating with the discharge hole and the communication path, respectively, air inside the mixing space is discharged to the outside by passing through the vacuum pump via the discharge hole, the foreign body catching member, and the communication path, and, by means of moving of the foreign body catching member disposed outside the container cover, the foreign body catching member has the one end thereof communicating with or blocked from the discharge hole and the other end thereof communicating with or blocked from the communication path so as to communicate the discharge hole and the communication path, a hollow protrusion communicating with the discharge hole protrudes upward from a bottom inside the foreign body catching member, and an upper end of the hollow protrusion protruding upward is open to the chamber.

The vacuum blender further includes a communication member having one end coupled to the body and the other end disposed outside the container cover, wherein the communication path is formed in the communication member, a mount hole is formed at the communication member, the foreign body catching member is coupled to be movable in an up-down direction in the mount hole of the communication member, and when the foreign body catching member is coupled to the communication member, the one end of the foreign body catching member communicates with the discharge hole and the other end of the foreign body catching member communicates with the communication path when the foreign body catching member is moved down, and the one end of the foreign body catching member is separated from the discharge hole to block the communication and the other end of the foreign body catching member is separated from the communication path to block the communication when the foreign body catching member is moved up.

A hollow-shape elastic member is mounted between an upper portion of the container cover and a lower portion of the foreign body catching member, and when the foreign body catching member is moved down, an upper end of the elastic member is in contact with the one end formed at a lower portion of the foreign body catching member and a lower end of the elastic member is in contact with an upper end of the container cover around the discharge hole, thereby sealing the discharge hole from the outside.

The communication member is mounted to be rotatable in the up-down direction with respect to the body, a hollow-shape elastic member is mounted at a lower portion of the other end of the communication member, and when the communication member is moved down, a lower end of the elastic member comes in contact with an upper end of the container cover, thereby sealing the discharge hole from the outside.

4

A transparent window is formed at the communication member at which the foreign body catching member is mounted, so a user can check microparticles collected in the foreign body catching member through the transparent window.

Alternatively, the communication member is formed in a cover shape blocking an outer circumferential surface of the crushing container from the outside by covering the crushing container and the container cover, the mount hole to which the foreign body catching member is detachably mounted is formed at the communication member formed in a cover shape, a through-hole that communicates with the discharge hole is formed at the mount hole, and when the foreign body catching member is mounted in the mount hole, the one end of the foreign body catching member communicates with the discharge hole via the through-hole and the other end of the foreign body catching member communicates with the communication path formed in the communication member.

Alternatively, the communication path is formed through the crushing container and the container cover, thereby enabling the vacuum pump and the discharge hole to communicate with each other; the foreign body catching member is detachably mounted at an outer portion of the container cover at the outside of the container cover; and when the foreign body catching member is coupled to the container cover, the one end of the foreign body catching member communicates with the discharge hole and the other end thereof communicates with the communication path.

Further, a blocking plate protruding downward from above is formed in the foreign body catching member, and a lower end of the blocking plate is positioned lower than the upper end of the hollow protrusion.

The communication member having the foreign body catching member mounted thereon is mounted to be rotatable on a hinge point in an up-down direction with respect to the body, and the other end, formed in a lateral direction of the foreign body catching member to communicate with the communication path, of the foreign body catching member is formed opposite to the hinge point with respect to a vertical center line of the foreign body catching member.

The vacuum blender further includes a communication member having one end coupled to the body and the other end disposed outside the container cover, and having a mount hole formed at an upper portion thereof, wherein the foreign body catching member is detachably coupled to the mount hole of the communication member and has a first communication hole and a second communication hole for communicating the inside and the outside, respectively, the first communication hole is formed in a downward direction of the foreign body catching member and the second communication hole is formed in a lateral direction of the foreign body catching member, the hollow protrusion protrudes in an upward direction of the first communication hole, the communication path is a connection channel formed in the communication member and having one end connected with the vacuum pump and the other end being open upward and exposed to the outside through a top of the communication member outside the mount hole, and when the foreign body catching member is mounted in the mount hole, the first communication hole communicates with the discharge hole disposed at a lower portion, and the second communication hole communicates with the other end of the connection channel, which is exposed to the outside at an upper portion of the communication member when the other end of the connection channel is covered.

A flange protruding outward is formed on the foreign body catching member, and when the foreign body catching member is mounted in the mount hole, the flange covers the other end of the connection channel and the second communication hole formed at the foreign body catching member communicates with the other end of the connection channel.

The foreign body catching member includes: a lower foreign body catching member part having the first communication hole formed at a lower portion thereof; and an upper foreign body catching member part detachably coupled to an upper portion of the lower foreign body catching member part, and the second communication hole is formed through a gap at a joint of the lower foreign body catching member part and the upper foreign body catching member part, and when the foreign body catching member is mounted in the mount hole and the flange covers the other end of the connection channel, the other end of the connection channel communicates with the second communication hole.

When the foreign body catching member is mounted in the mount hole and the flange covers the other end of the connection channel, a movement gap is formed between a bottom of the flange and a top of the communication member, and the other end of the connection channel communicates with the second communication hole through the movement gap.

The second communication hole is formed through a side of the foreign body catching member, and when the foreign body catching member is mounted in the mount hole and the flange covers the other end of the connection channel, the other end of the connection channel communicates with the second communication hole formed through the side of the foreign body catching member.

The vacuum blender further includes a communication member having one end coupled to the body and the other end disposed outside the container cover, and having a mount hole formed at an upper portion thereof, wherein the foreign body catching member is detachably coupled to the mount hole of the communication member and has a first communication hole and a second communication hole for communicating the inside and the outside, respectively, the first communication hole is formed in a downward direction of the foreign body catching member and the second communication hole is formed in a lateral direction of the foreign body catching member, the communication path is a connection channel formed in the communication member and having one end connected with the vacuum pump and the other end communicating with the foreign body catching member mounted in the mount hole, wherein the first communication hole is formed in a downward direction of the foreign body catching member and the second communication hole is formed in a lateral direction of the foreign body catching member, and when the foreign body catching member is mounted in the mount hole, a chamber channel sealed from the outside is formed between an outer surface of the foreign body catching member and an inner circumferential surface of the mount hole, the first communication hole communicates with the discharge hole disposed at a lower portion, and the second communication hole communicates with the other end of the connection channel through the chamber channel.

The vacuum blender further includes: a lower gasket disposed between a lower portion of the foreign body catching member and an inner surface of a lower portion of the mount hole, thereby sealing a gap therebetween; and an upper gasket disposed between an upper portion of the foreign body catching member and an upper portion of the communication member or between the upper portion of the foreign body catching member and an inner surface of an upper portion of the mount hole, thereby sealing a gap therebetween, wherein when the foreign body catching member is mounted in the mount hole, the chamber channel sealed from the outside is formed between an outer surface of the foreign body catching member and an inner circumferential surface of the mount hole by the lower gasket and the upper gasket.

The other end of the connection channel is exposed to the outside through a top of the communication member at the outside of the mount hole, and the other end of the connection channel communicates with the second communication hole through the chamber channel in a state where a portion of the foreign body catching member covers the other end of the connection channel.

Alternatively, the other end of the connection channel is open toward the mount hole and communicates with the second communication hole through the chamber channel.

The foreign body catching member includes: a lower foreign body catching member part having the first communication hole formed at a lower portion thereof; and an upper foreign body catching member part detachably coupled to an upper portion of the lower foreign body catching member part, and the second communication hole is formed through a gap at a joint of the lower foreign body catching member part and the upper foreign body catching member part when the lower foreign body catching member part and the upper foreign body catching member part are combined.

Further, a foreign body catching member for a vacuum blender of the present invention is a foreign body catching member detachably mounted on the vacuum blender and receiving microparticles generated when crushing food received between a crushing container and a container cover, wherein the foreign body catching member is disposed outside the container cover coupled to an upper portion of the crushing container, the foreign body catching member disposed outside the container cover has one end communicating with or blocked from a discharge hole formed at the container cover by means of moving, a chamber receiving microparticles is formed in the foreign body catching member, a hollow protrusion communicating with the discharge hole protrudes upward from a bottom inside the foreign body catching member, and an upper end of the hollow protrusion protruding upward is open to the chamber.

Advantageous Effects of Invention

According to the present disclosure, it is possible to prevent microparticles from flowing into a vacuum pump because microparticles that are produced when food is crushed are collected in the foreign body catching member.

Further, according to the present disclosure, the foreign body catching member is detachably coupled to the communication member outside the crushing container rather than at a lower portion of the container cover, so assembling and cleaning are easy, and it is possible to accommodate a lot of microparticles because the foreign body catching member can be manufactured in a large size.

Further, even though vacuum operation and crushing operation are performed together when food in the crushing container is crushed, it is possible to prevent breakdown of a vacuum pump and a pressure sensor due to backflow of microparticles that are produced when food is crushed. Further, since vacuum operation and crushing operation are performed simultaneously, it is possible to remarkably reduce the operation time.

Further, the other end of the connection channel communicating with the second communication hole of the foreign body catching member is exposed to the outside through the top of the communication member, so cleaning, etc. are easy.

DESCRIPTION OF EMBODIMENTS

First Embodiment

Figure 1:
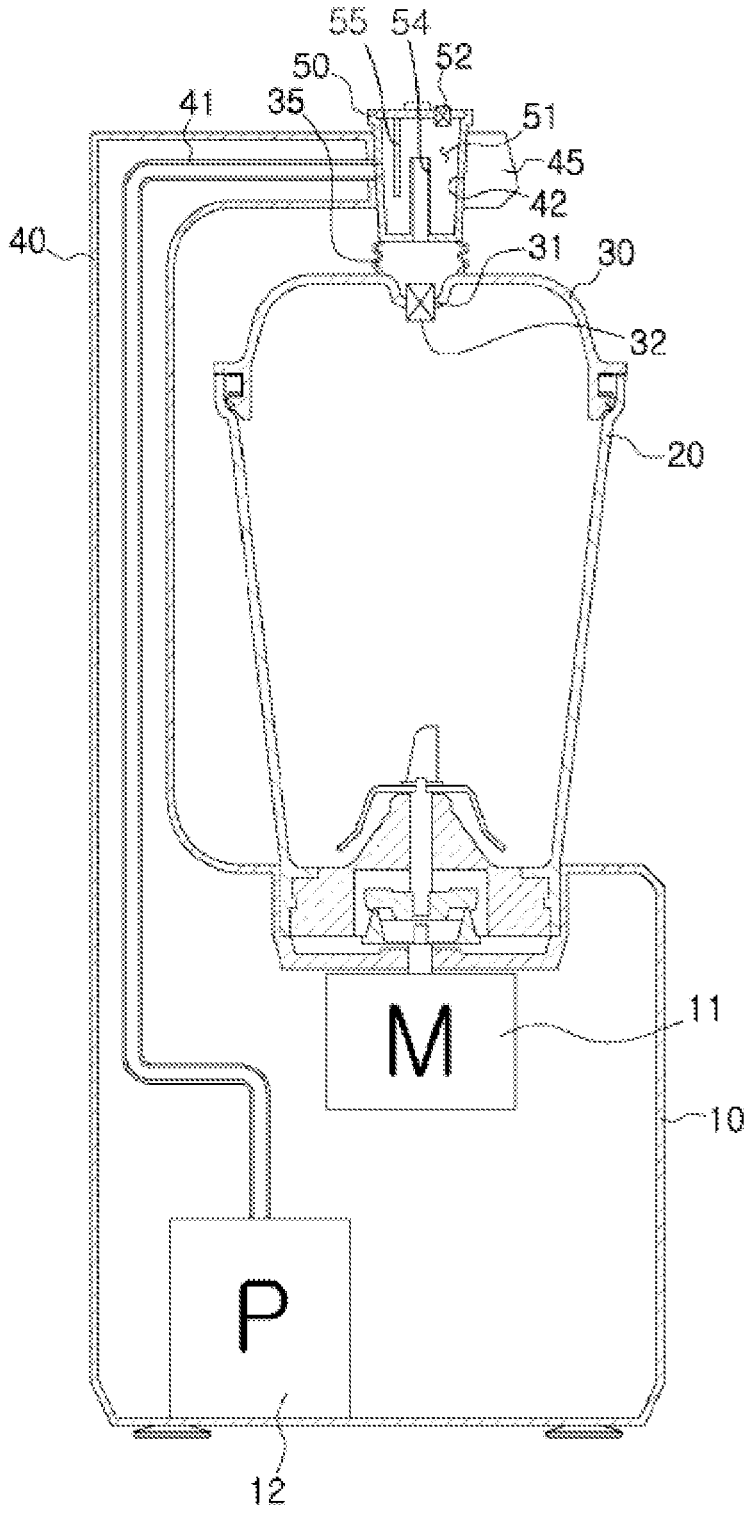
FIG. 1 is a structural cross-sectional view of a vacuum blender according to a first embodiment of the present disclosure.
Figure 2:
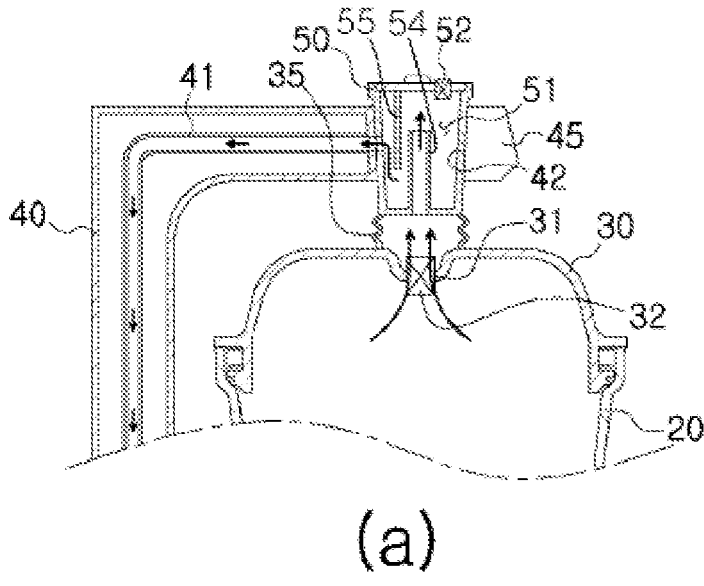
FIG. 2 is a partial structural view when a foreign body catching member is moved up and down in FIG. 1.
Figure 2:
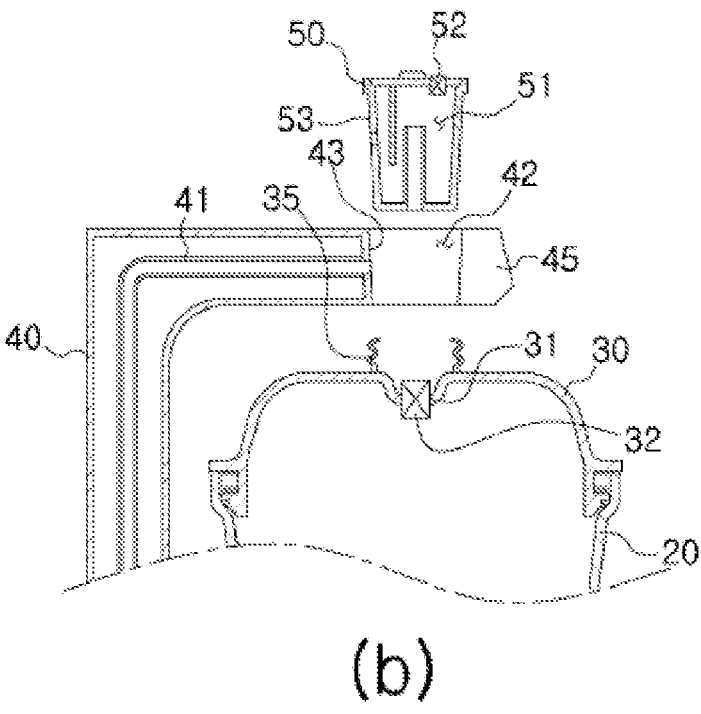

FIG. 1 is a structural cross-sectional view of a vacuum blender according to a first embodiment of the present disclosure, and FIG. 2 is a partial structural view when a foreign body catching member has been moved up and down in FIG. 1.

A vacuum blender having a foreign body catching member mounted thereon of the present disclosure, as shown in FIG. 1, includes a body 10, a crushing container 20, a container cover 30, a communication member 40, and a foreign body catching member 50.

The body 10 is equipped with a motor 11 and a vacuum pump 12.

The crushing container 20 is coupled to the body 10 and has a mixing space therein in which food is received.

The container cover 30 is coupled to the upper portion of the crushing container 20, thereby covering the upper portion of the mixing space.

A discharge hole 31 that communicates the mixing space with the outside is formed through the container cover 30.

Further, a check valve 32 is mounted in the discharge hole 31.

The communication member 40 has one end coupled to the body 10 and the other end disposed over the container cover 30.

The communication member 40 may be formed in various shapes other than the shape shown in the figures.

A communication path 41 that enables the discharge hole 31 of the container cover 30 and the vacuum pump 12 to communicate with each other is formed in the communication member 40.

In this embodiment, the communication member 40 is fixedly coupled to the body 10.

The foreign body catching member 50 is disposed not inside, but outside the container cover 30.

The foreign body catching member 50 has one end communicatably coupled to the discharge hole 31 and the other end communicatably coupled to the communication path 41 of the communication member 40.

The foreign body catching member 50 has a chamber 51 therein in which microparticles that are produced when food is crushed are collected.

In the figure of this embodiment, the one end communicating with the discharge hole 31 is formed at the lower portion of the foreign body catching member 50 and the other end communicating with the communication path 41 is formed on the side of the foreign body catching member 50.

Further, a hollow protrusion 54 communicating with the discharge hole 31 protrudes upward from the bottom inside the foreign body catching member 50 and the upper end of the hollow protrusion 54 protruding upward is open in the chamber 51.

Further, a blocking plate 55 protruding downward from above is formed in the foreign body catching member 50, and the lower end of the blocking plate 55 is positioned lower than the upper end of the hollow protrusion 54.

Microparticles flowing into the foreign body catching member 50 can be prevented from moving back to the discharge hole 31 by the hollow protrusion 54, and microparticles discharged from the hollow protrusion 54 can be prevented from moving directly to the communication path 41 by the blocking plate 55.

Since structures known in the art are enough to be used as the internal structure for the foreign body catching member 50 to collect foreign substances flowing into it, the internal structure is not described in detail.

Accordingly, in a state where the vacuum pump 12 is operated with the one end and the other end of the foreign body catching member 50 communicating with the discharge hole 31 and the communication path 41, respectively, the air in the mixing space is discharged to the outside by passing through the vacuum pump 12 via the discharge hole 31, the foreign body catching member 50, and the communication path 41.

That is, the discharge hole 31 and the communication path 41 are communicating with or blocked from each other through the foreign body catching member 50.

It is apparent that sealing members such as an O-ring and a gasket should be mounted at appropriate positions to prevent exchange of external air and internal air in the configuration forming the space for movement of air, including the foreign body catching member 50, the discharge hole 31, and the communication path 41.

A mount hole 42 is formed at the upper portion of the communication member 40, and, as shown in FIG. 2, the foreign body catching member 50 is detachably coupled to the mount hole 42 of the communication member 40 at the outside of the container cover 30.

Since the foreign body catching member 50 is detachably coupled to the mount hole 42 of the communication member 40 at the outside of the crushing container 20, as described above, it is possible to manufacture the foreign body catching member 50 in a large size, whereby the amount of microparticles that are collected is increased, and accordingly, it is possible to use the vacuum blender for a long period of time even without frequently washing the foreign body catching member 50.

Further, since the foreign body catching member 50 is mounted in the communication member 40 rather than at the lower portion of the container cover 30, assembling is easy and washing is also easy.

The mount hole 42 may be formed in a cylindrical shape and may be formed in various other shapes.

The one end of the foreign body catching member 50 is communicating with or separated and blocked from the discharge hole 31 by up-down movement relative to the container cover 30.

In this embodiment, the foreign body catching member 50 is coupled to be movable in the up-down direction with respect to the communication member 40.

That is, the foreign body catching member 50 is coupled in the mount hole 42 formed at the communication member 40 to be movable in the up-down direction.

By this structure, in a state where the foreign body catching member 50 is coupled to the mount hole 42 of the communication member 40, when the foreign body catching member 50 is moved down, the one end, that is, the lower end of the foreign body catching member 50 comes in contact with the upper portion of the discharge hole 31, whereby the foreign body catching member 50 and the discharge hole 31 communicate with each other and the other end simultaneously moved down communicates with the communication path 41.

Further, when the foreign body catching member 50 is moved up, the one end of the foreign body catching member 50 is separated, spaced, and blocked from the discharge hole 31, and the other end of the foreign body catching member 50 simultaneously moved up is separated and blocked from the communication path 41.

As described above, the foreign body catching member 50 communicates with or blocked from the discharge hole 31 and the communication path 41 by up-down movement of the foreign body catching member 50.

In order for the other end of the foreign body catching member 50 to communicate with or be blocked from the communication path 41 by up-down movement of the foreign body catching member 50, for example, a first inclined surface 43 inclined downward is formed at the other end of the communication path 41 communicating with the other end of the foreign body catching member 50.

Further, a second inclined surface 53 inclined upward to come in contact with the first inclined surface 43 is formed at the other end of the foreign body catching member 50, that is, on the side of the foreign body catching member 50 in this figure.

Accordingly, when the foreign body catching member 50 is moved down, the second inclined surface 53 disposed at a high position comes down and contacts the first inclined surface 43, so the foreign body catching member 50 naturally communicates with the communication path 41.

Of course, the foreign body catching member 50 and the communication path 41 may be formed straightly or in other shapes without the inclined surfaces at the outer circumferential surface and the other end, respectively.

In this case, in order to maintain the state in which the foreign body catching member 50 mounted in the mount hole 42 is inserted in the mount hole 42, a separate support plate (not shown) may be disposed at the lower portion of the foreign body catching member 50 so that the foreign body catching member 50 can keep fitted in the mount hole 42 without falling.

Further, a locking member (not shown) may be installed to prevent the foreign body catching member 50 from unexpectedly separating from the mount hole 42 when the foreign body catching member 50 is inserted in the mount hole 42.

In this case, the locking member can prevent separation of the foreign body catching member 50 and simultaneously can press the foreign body catching member 50 such that the one end and the other end of the foreign body catching member 50 are brought in close contact with the discharge hole 31 and/or the communication path 41.

Since locking structures known in the art are enough to be used as the detailed structure and shape of the locking member, the detailed description is omitted.

Further, vacuum release valve 52 that communicates the inside and the outside of the foreign body catching member 50 may be mounted on the foreign body catching member 50.

The chamber 51 formed in the foreign body catching member 50 communicates with the outside by the vacuum release valve 52, whereby vacuum of the chamber 51 can be released.

Depending on cases, it may be possible to control opening/closing of the communication path 41 by mounting a solenoid valve that communicates with the communication path 41, etc. without the vacuum release valve 52.

Further, a hollow-shape elastic member 35 is mounted between the upper portion of the container cover 30 and the lower portion of the foreign body catching member 50. The elastic member 35 makes the internal space thereof into a sealed space while in contact with the upper portion of the container cover 30 and the lower portion of the foreign body catching member 50.

The elastic member 35 may have various shapes, and for example, the elastic member 35 is formed in a rubber bellows shape and can elastically deform in the up-down direction.

The elastic member 35 formed in a hollow shape in the figures of this embodiment is mounted around the discharge hole 31 at the upper portion of the container cover 30.

Accordingly, when the foreign body catching member 50 is moved down, the inside of the elastic member 35 is separated from the outside while the lower portion of the foreign body catching member 50 comes in contact with the upper end of the elastic member 35, whereby the discharge hole 31 communicates with the foreign body catching member 50 in a sealed state without being open to the outside.

Meanwhile, the upper end of the elastic member 35 may be coupled to the lower portion of the foreign body catching member 50.

In this case, when the foreign body catching member 50 is moved down, the lower end of the elastic member 35 comes in contact with the upper end of the container cover 30 while moving down with the foreign body catching member 50, thereby sealing the discharge hole 31 from the outside.

Further, a transparent window 45 may be formed at the communication member 40 to which the foreign body catching member 50 is mounted, so it may be possible to check the microparticles collected in the foreign body catching member 50.

By this structure, microparticles that are produced when food is crushed are collected into the foreign body catching member 50 in the present disclosure, so it is possible to prevent microparticles from flowing into the vacuum pump 12.

Further, since the foreign body catching member 50 collects microparticles, there is no problem even though vacuum operation and crushing operation are simultaneously performed, whereby it is possible to remarkably reduce the operation time of the vacuum blender.

In addition, since the foreign body catching member 50 is attachable and detachable to and from the communication member 40 in the present disclosure, it is easy to wash and clean the foreign body catching member 50.

Second Embodiment

Figure 3:
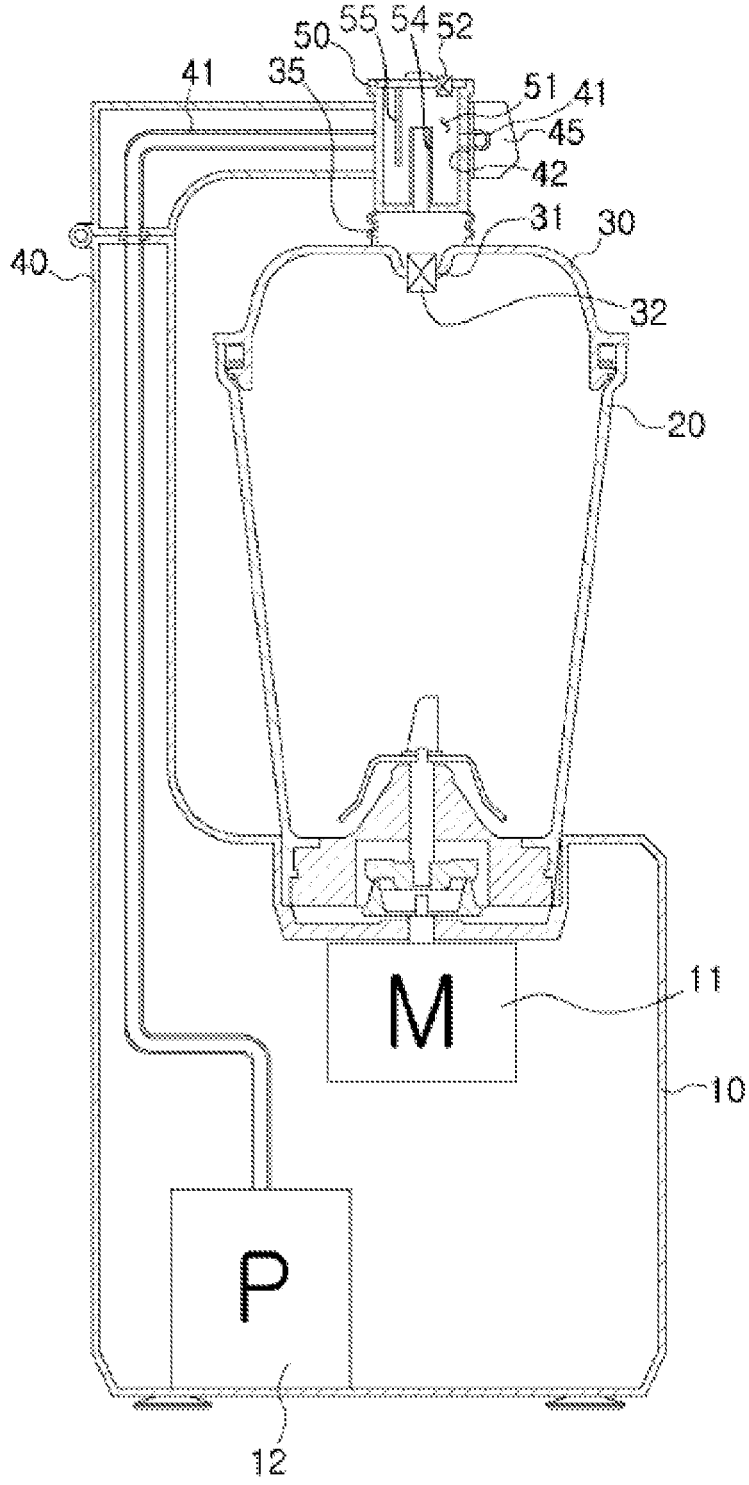
FIG. 3 is a structural cross-sectional view of a vacuum blender according to a second embodiment of the present disclosure.
Figure 4:
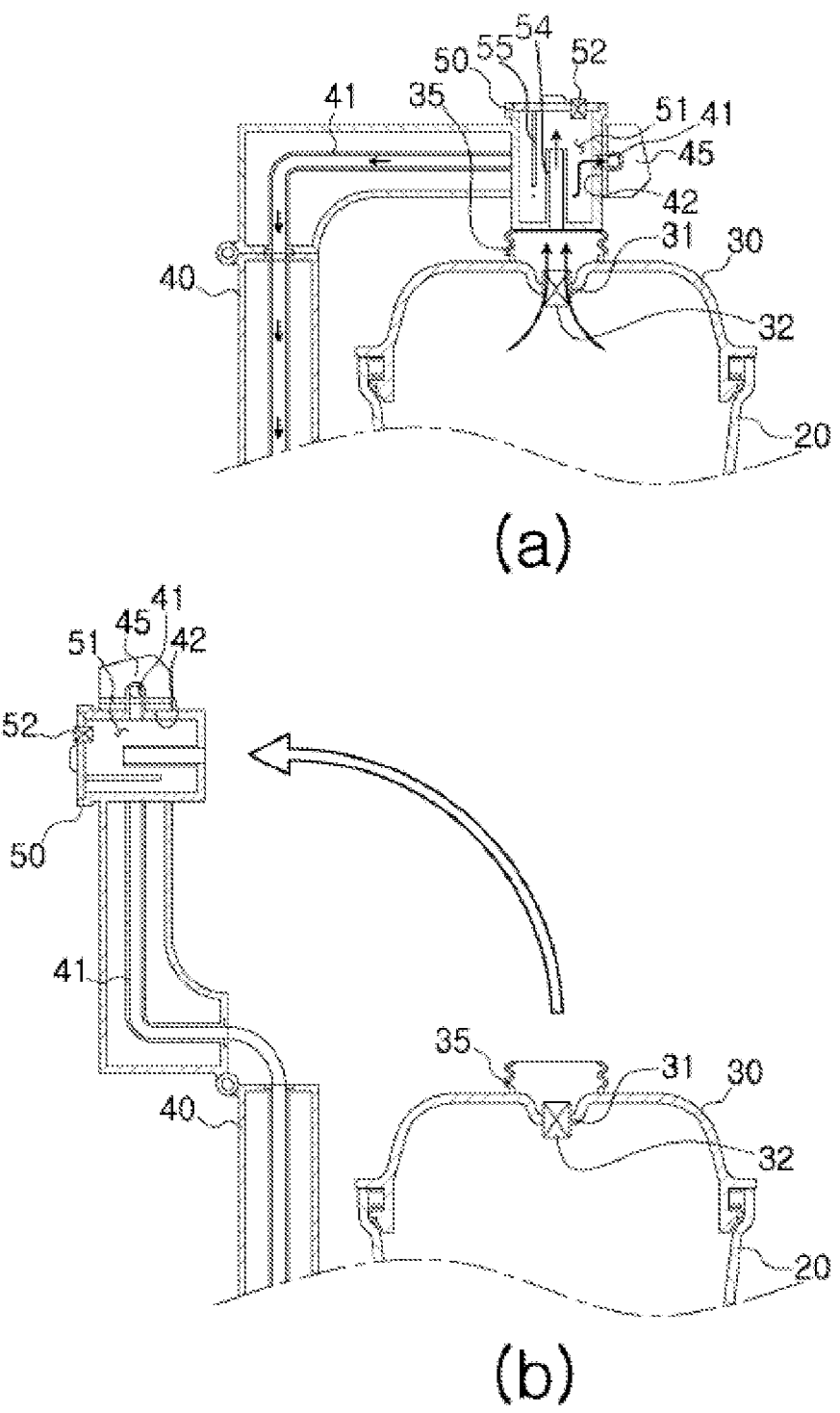
FIG. 4 is a partial structural view when a communication member is moved up and down in FIG. 3.
Figure 5:
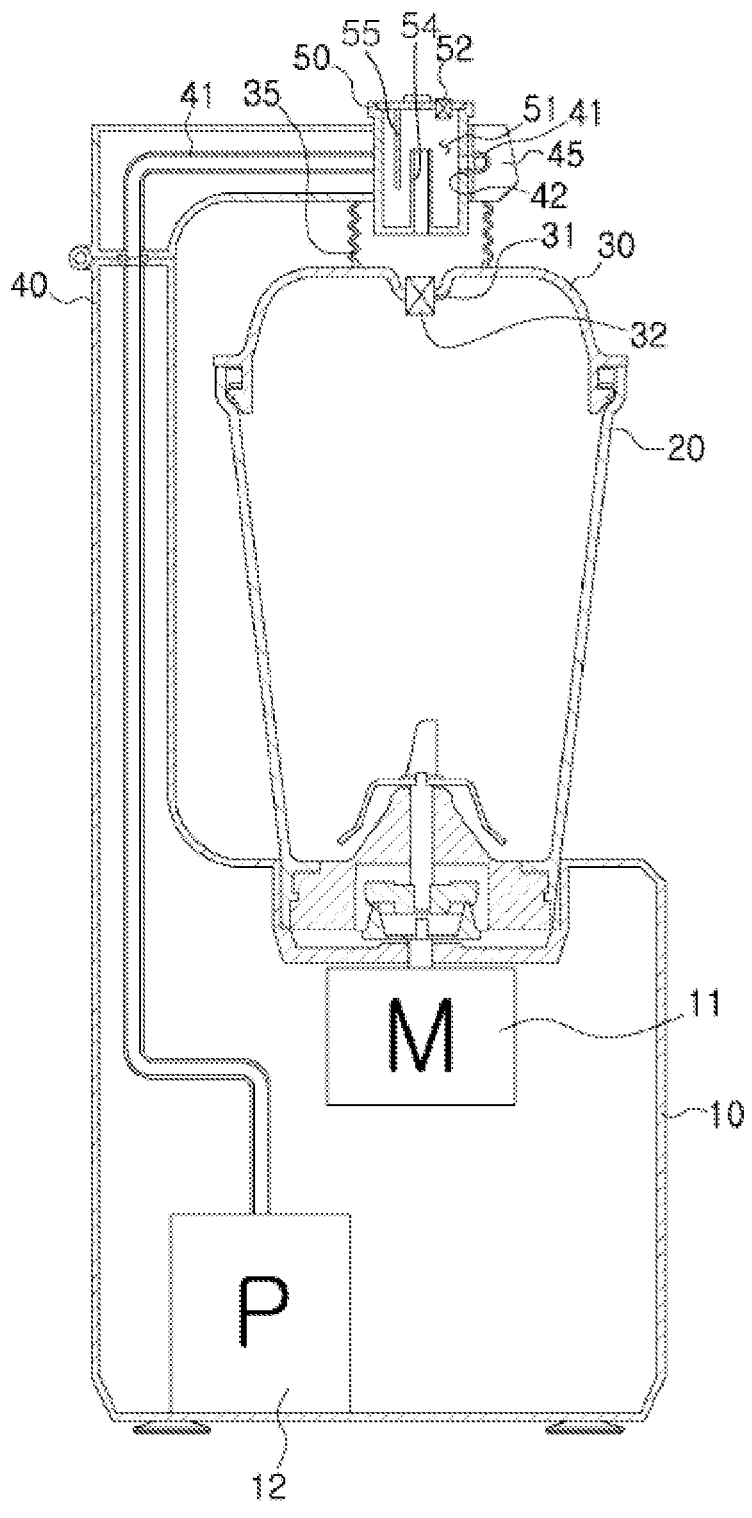
FIG. 5 is a structural cross-sectional view of a vacuum blender according to a modified second embodiment of the present disclosure.

FIG. 3 is a structural cross-sectional view of a vacuum blender according to a second embodiment of the present disclosure, FIG. 4 is a partial structural view when the communication member is moved up and down in FIG. 3, and FIG. 5 is a structural cross-sectional view of a vacuum blender according to a modified second embodiment of the present disclosure.

The second embodiment is different from the first embodiment in the mounting structure of the communication member 40, so this is mainly described.

In this embodiment, the communication member 40 is mounted to be movable or rotatable in the up-down direction with respect to the body 10.

In more detail, the communication member 40 may be mounted such that the entire or the other end thereof is movable in the up-down direction with respect to the body 10 or the other end is rotatable in the up-down direction with respect to the lower end thereof.

It is shown in the figure of this embodiment that the other end of the communication member 40 is rotatable in the up-down direction.

By the movement of the communication member 40 described above, as shown in FIG. 4, the other end of the communication member 40 disposed over the discharge hole 31 and the discharge hole 31 may be communicating with or separated from each other.

The other end of the communication member 40 and the discharge hole 31 may be communicating with or blocked from each other through the foreign body catching member 50, as in the first embodiment.

In more detail, in a state where the foreign body catching member 50 is coupled to the communication member 40 and the other end of the foreign body catching member 50 is communicating with the communication path 41, the one end of the foreign body catching member 50 communicates with the discharge hole 31 when the communication member 40 is moved down, and the one end of the foreign body catching member 50 is blocked from the discharge hole 31 when the communication member 40 is moved up.

In this configuration, the foreign body catching member 50 may be simply detachably coupled to the communication member 40 or may be coupled to be movable in the up-down direction, as in the first embodiment.

Further, the other end of the foreign body catching member 50 that communicates with the communication path 41 communicates with the communication path 41 in a direction opposite to the disposition direction of an up-down rotary hinge module of the communication member 40.

Accordingly, it is possible to prevent microparticles, etc. collected in the foreign body catching member 50 from flowing inside through the communication path 41 in a state where the communication member 40 is rotated in the up-down direction, as shown in (b) of FIG. 4.

Meanwhile, when the communication member 40 is mounted to be rotatable in the up-down direction with respect to the body 10, as in this embodiment, the elastic member 35 may be mounted at the upper portion of the container cover 30 or at the lower end of the foreign body catching member 50, and as shown in FIG. 5, may be mounted at the lower portion of the other end of the communication member 40.

In a case where the elastic member 35 is mounted at the lower portion of the other end of the communication member 40, when the communication member 40 is moved down, the lower end of the elastic member 35 comes in contact with the upper end of the container cover 30, thereby sealing the discharge hole 31 from the outside.

The other configurations are the same as or similar to those of the first embodiment, so they are not described in detail.

Third Embodiment

Figure 6:
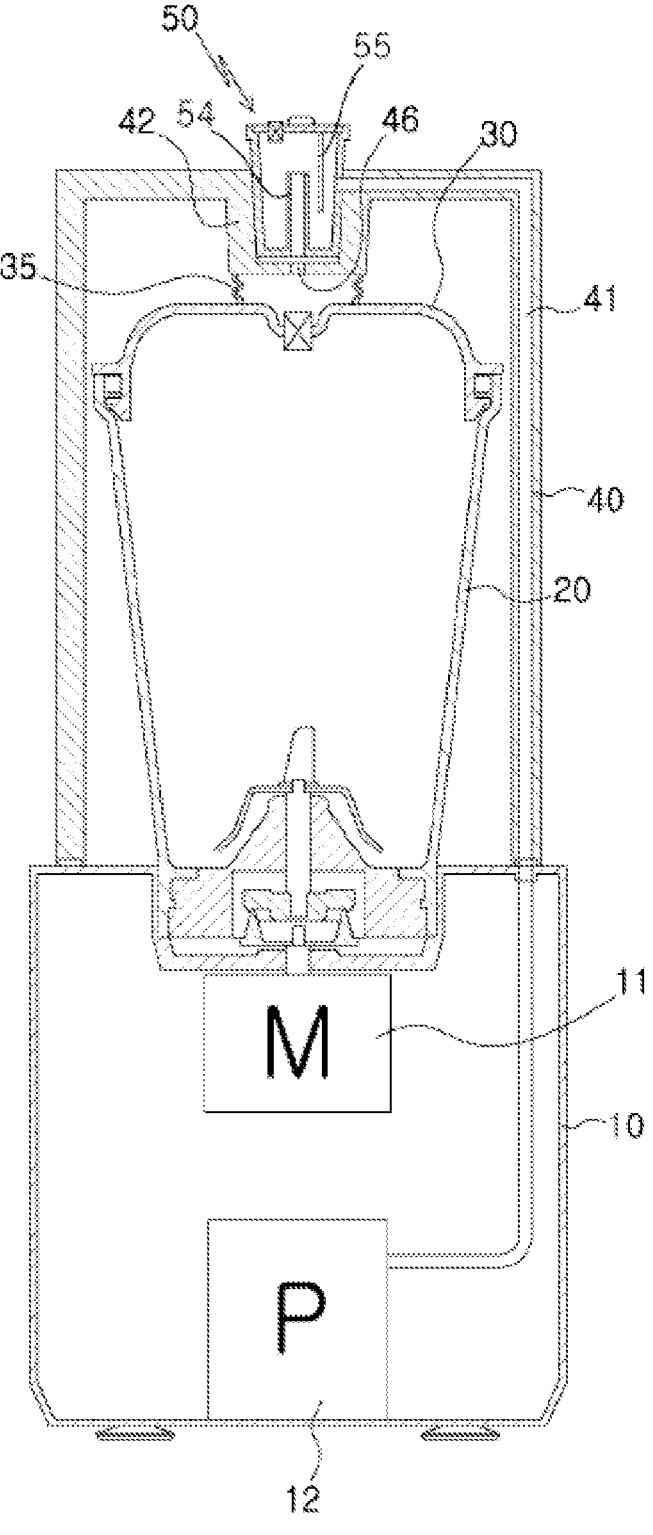
FIG. 6 is a structural cross-sectional view of a vacuum blender according to a third embodiment of the present disclosure.
Figure 7:
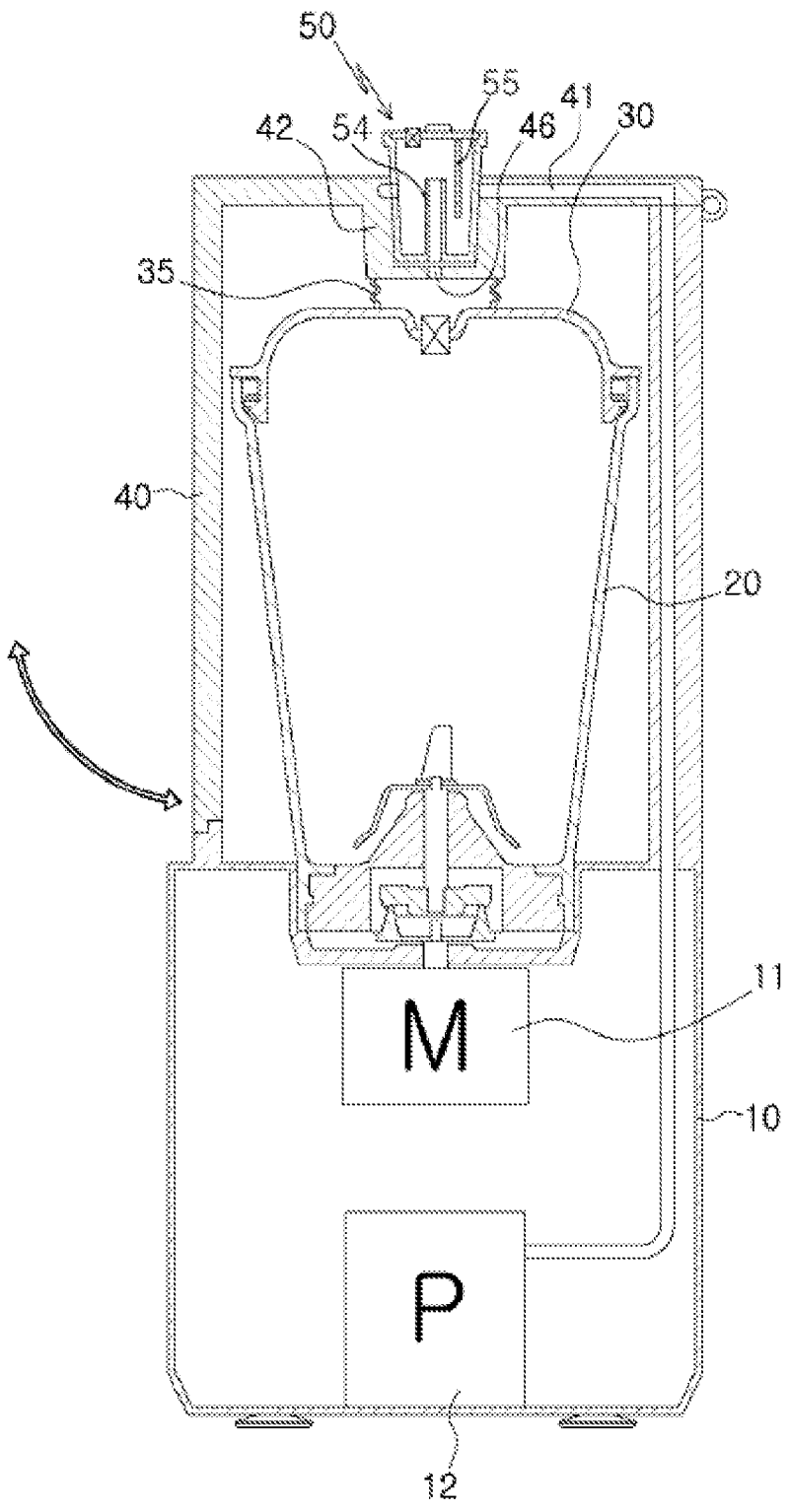
FIG. 7 is a structural cross-sectional view of a vacuum blender according to a modified third embodiment of the present disclosure.

FIG. 6 is a structural cross-sectional view of a vacuum blender according to a third embodiment of the present disclosure, and FIG. 7 is a structural cross-sectional view of a vacuum blender according to a modified third embodiment of the present disclosure.

The third embodiment is different from the first embodiment in the mounting structure of the communication member 40, so this is mainly described.

In this embodiment, as shown in FIG. 6, the communication member 40 is formed in a cover shape and is detachably coupled to the body 10.

The cover-shaped communication member 40 blocks the outer circumferential surface of the crushing container 20 from the outside by covering the crushing container 20 and the container cover 30.

Further, the communication path 41 formed in the communication member 40 is formed along the cover-shaped communication member 40, and the detailed position may depend on various shapes and structures known in the art.

The mount hole 42 to which the foreign body catching member 50 is detachably coupled is formed at the cover-shaped communication member 40, and a through-hole 46 communicating with the discharge hole 31 is formed in the mount hole 42.

Further, the elastic member 35 is mounted at the upper portion of the container cover 30 or the lower portion of the mount hole 42 to surround the discharge hole 31 and the through-hole 46.

When the foreign body catching member 50 is mounted in the mount hole 42, the one end of the foreign body catching member 50 communicates with the discharge hole 31 through the through-hole 46 and the other end of the foreign body catching member 50 communicates with the communication path 41 formed in the communication member 40.

The cover-shaped communication member 40, as shown in FIG. 6, may be formed in a fully detachable type, and, as shown in FIG. 7, may be mounted to be rotatable in the up-down direction with respect to the body 10.

The other configurations are the same as or similar to those of the first embodiment, so they are not described in detail.

Fourth Embodiment

Figure 8:
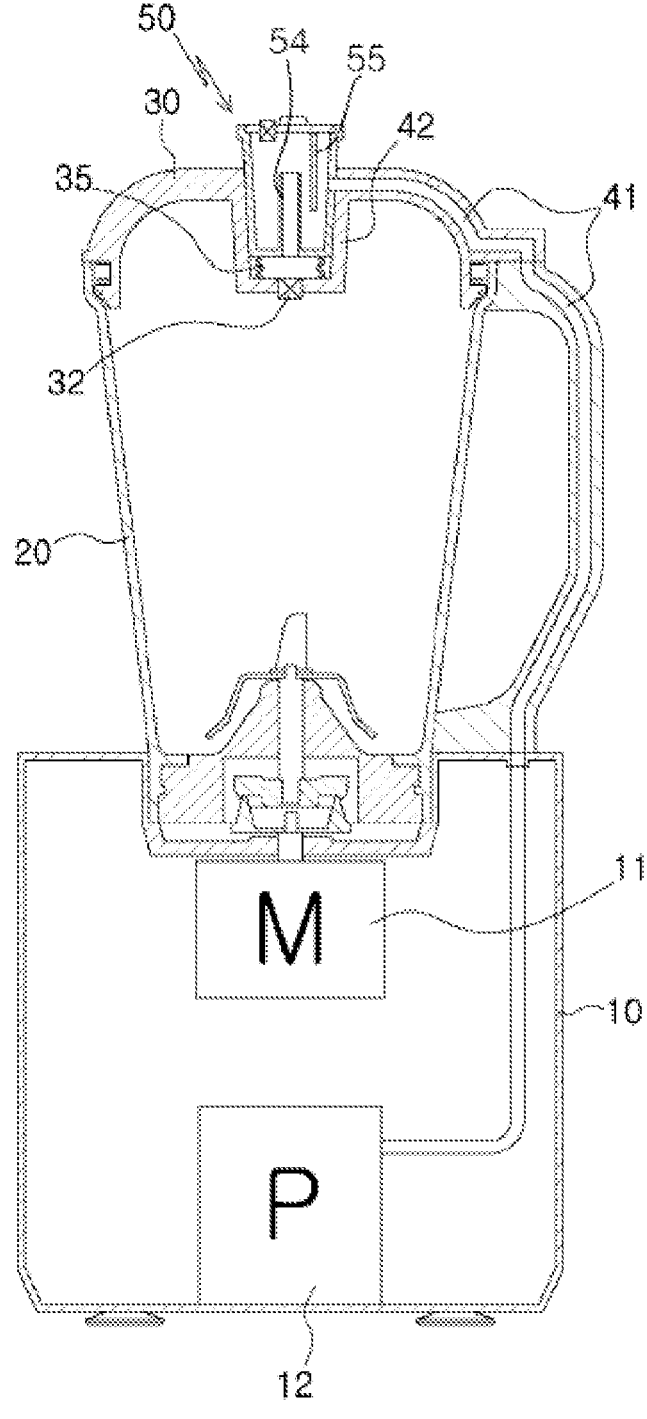
FIG. 8 is a structural cross-sectional view of a vacuum blender according to a fourth embodiment of the present disclosure.

FIG. 8 is a structural cross-sectional view of a vacuum blender according to a fourth embodiment of the present disclosure and The fourth embodiment is different from the first embodiment in that the communication member 40 is not provided.

In this embodiment, the communication path 41 is formed through the crushing container 20 and the container cover 30.

The communication path 41 formed in this way enables the vacuum pump 12 and the discharge hole 31 formed at the container cover 30 to communicate with each other.

In this embodiment, since the communication member 40 is not provided, the foreign body catching member 50 is detachably coupled to the upper portion of the container cover 30 at the outside of the container cover 30.

In this configuration, a separate locking member for coupling the foreign body catching member 50 to the container cover 30 may be needed.

When the foreign body catching member 50 is coupled to the upper portion of the container cover 30, the one end of the foreign body catching member 50 communicates with the discharge hole 31 and the other end communicates with the communication path 41.

The other configurations are the same as or similar to those of the first embodiment, so they are not described in detail.

Fifth Embodiment

Figure 9:
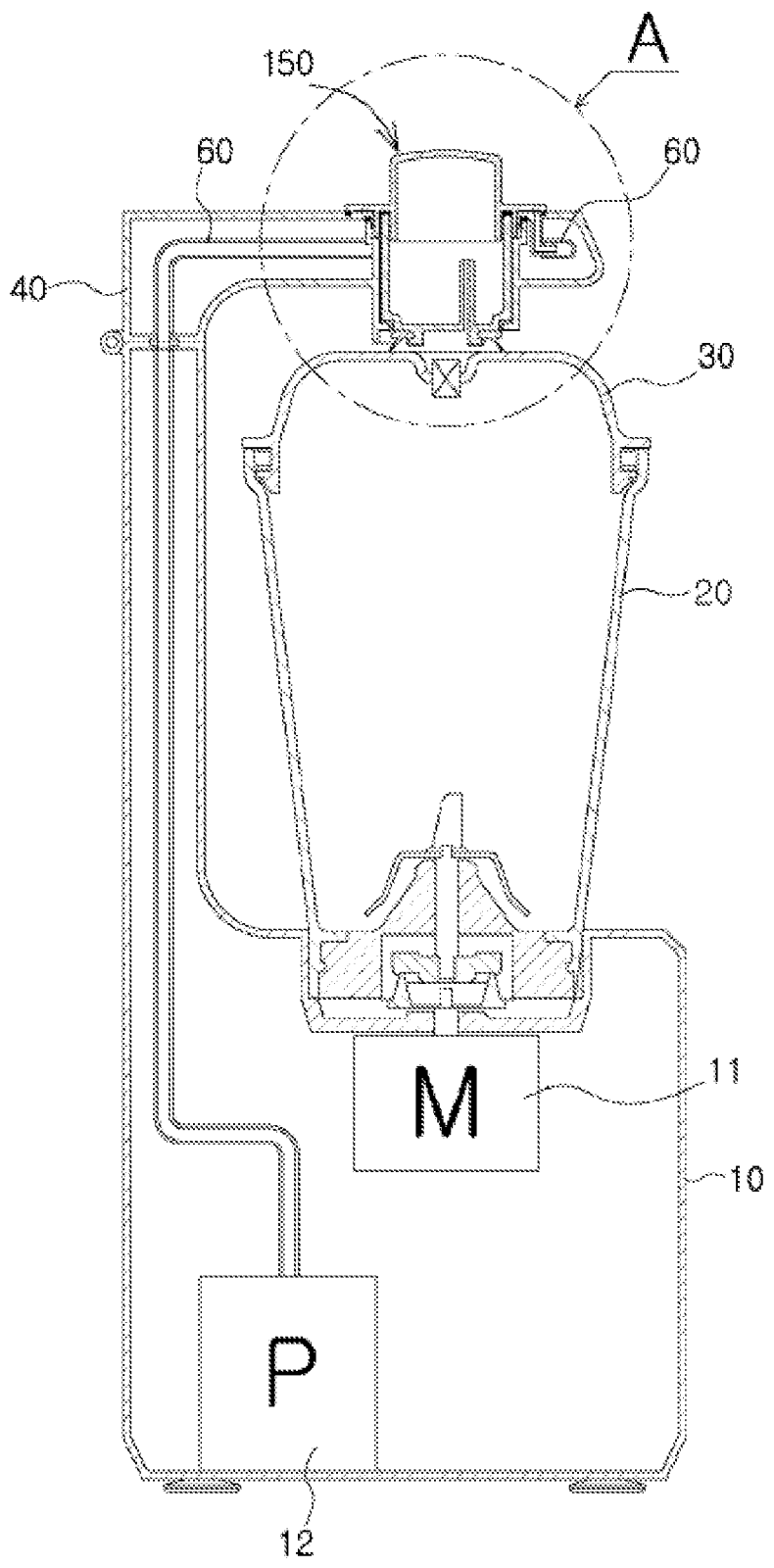
FIG. 9 is a structural cross-sectional view of a vacuum blender according to a fifth embodiment of the present disclosure.
Figure 10:
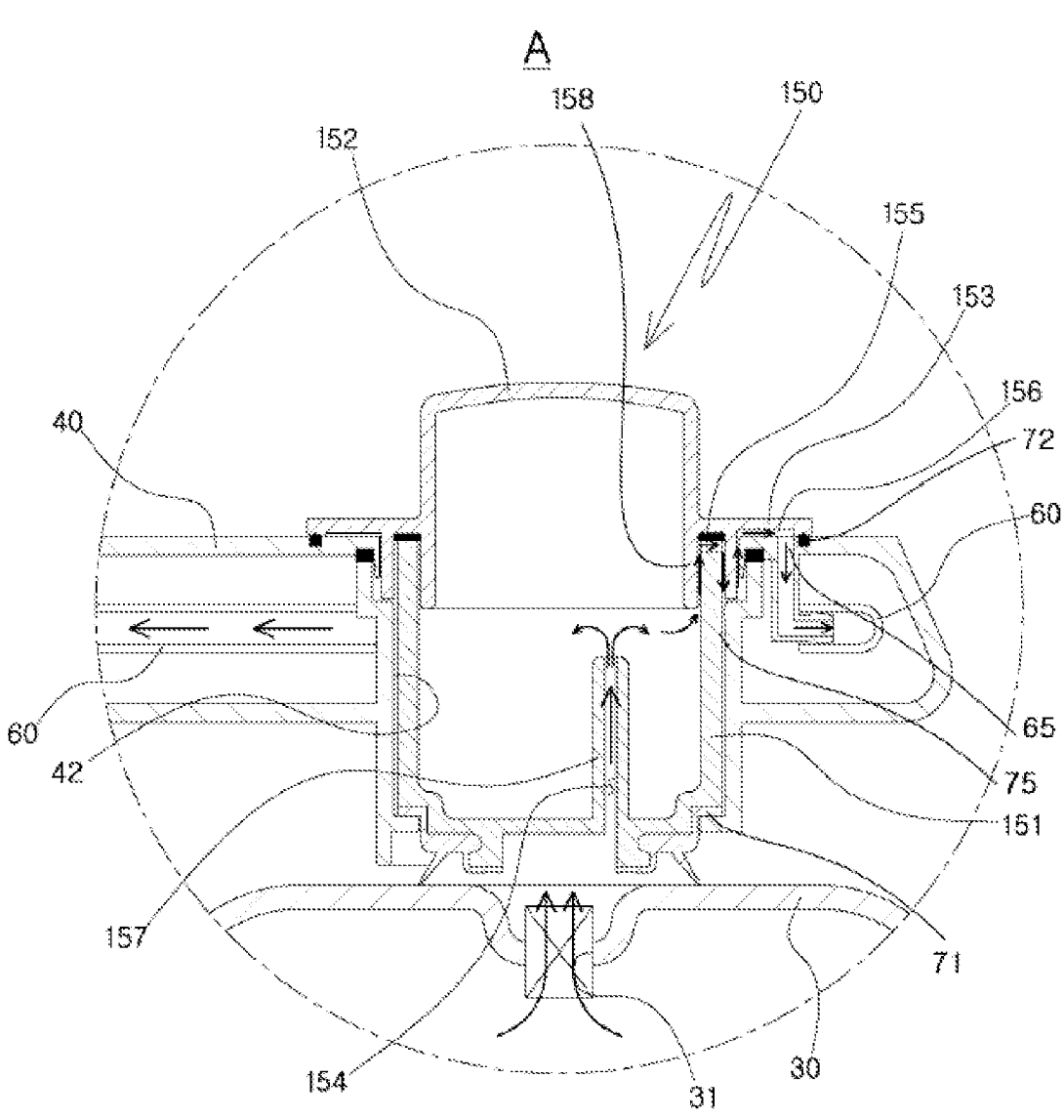
FIG. 10 is an enlarged view of the portion A of FIG. 9.
Figure 11:
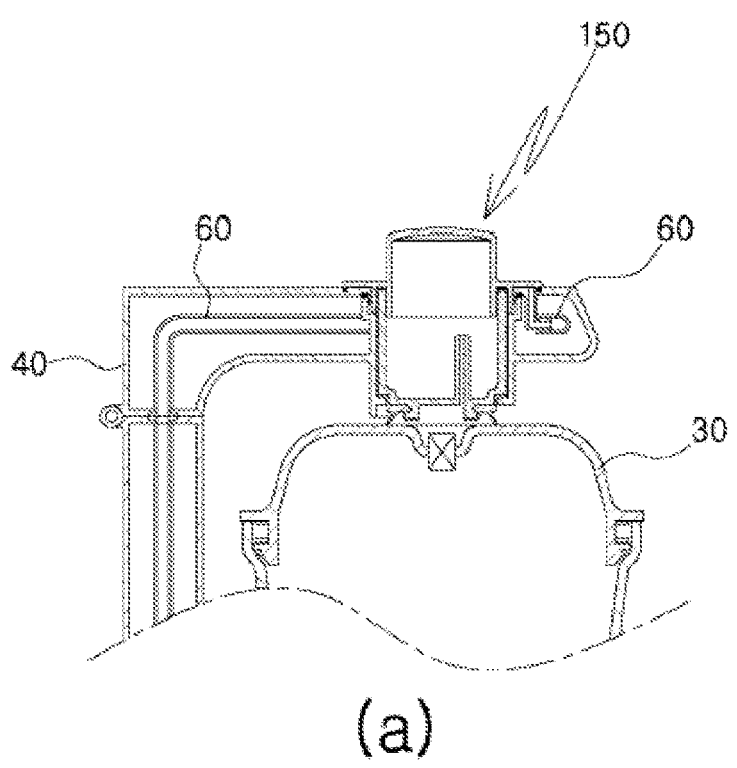
FIG. 11 is a partial structural view when a foreign body catching member is moved up and down in FIG. 9.
Figure 11:
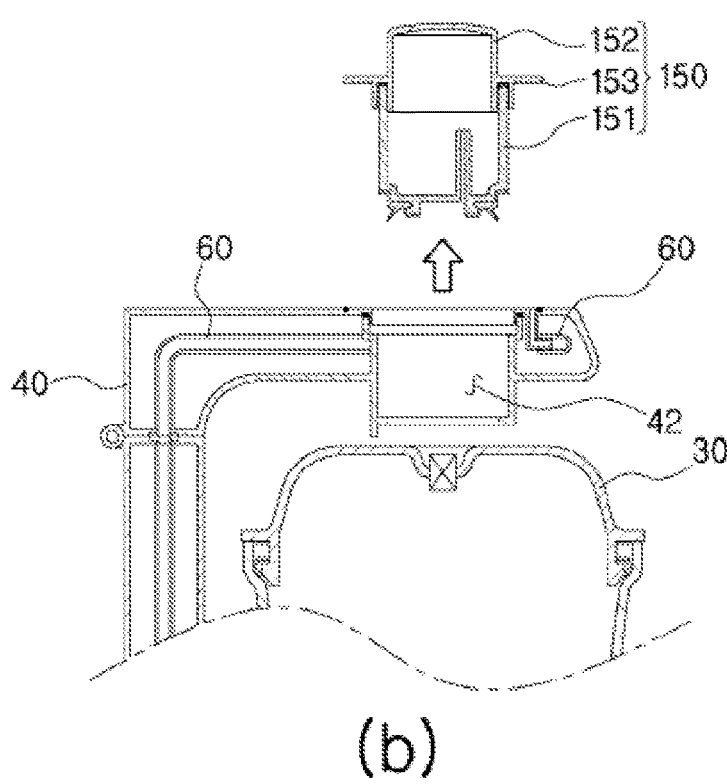
Figure 12:
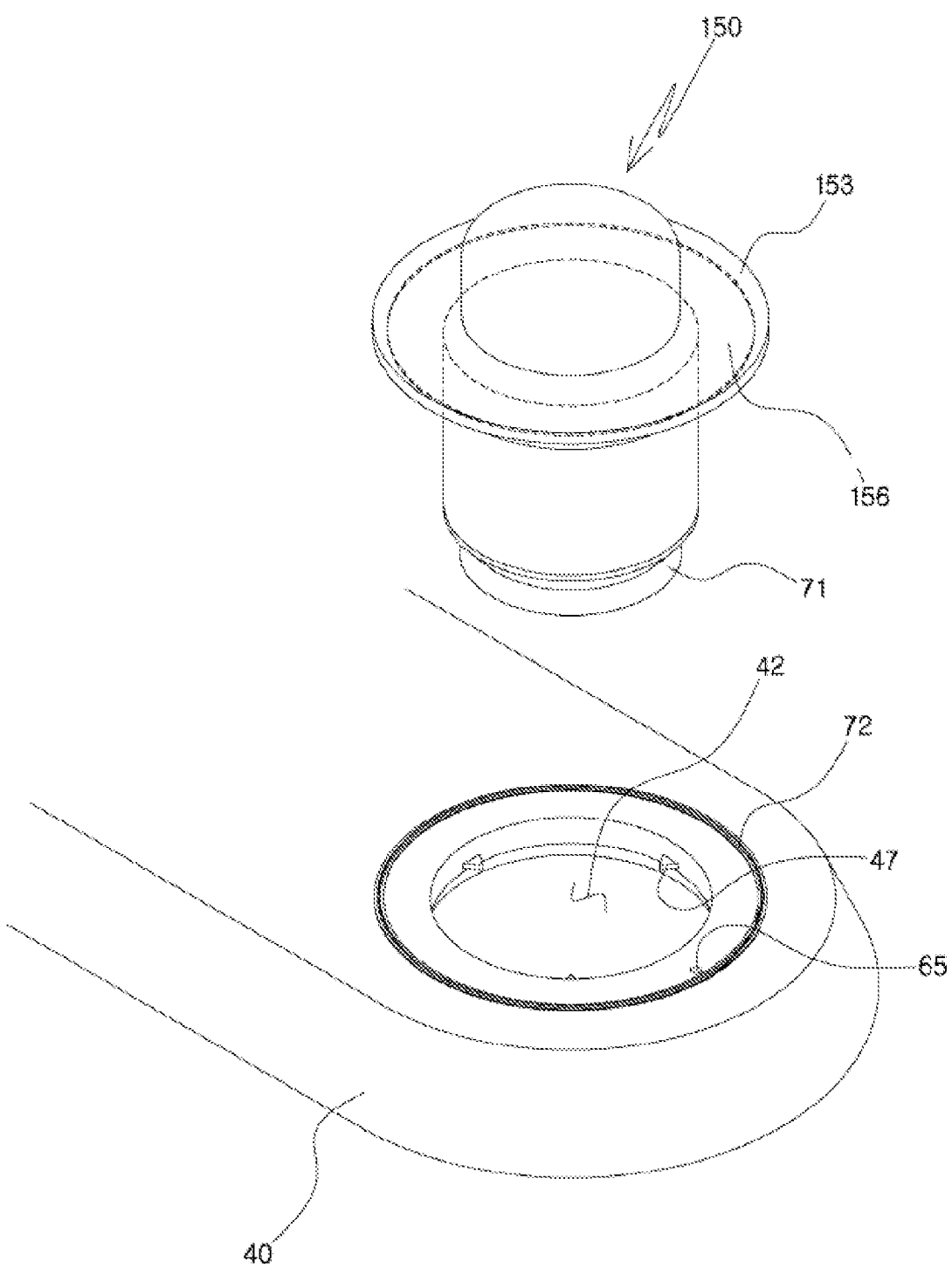
FIG. 12 is an exploded perspective view of the foreign body catching member and the communication member of the vacuum blender according to the fifth embodiment of the present disclosure.
Figure 13:
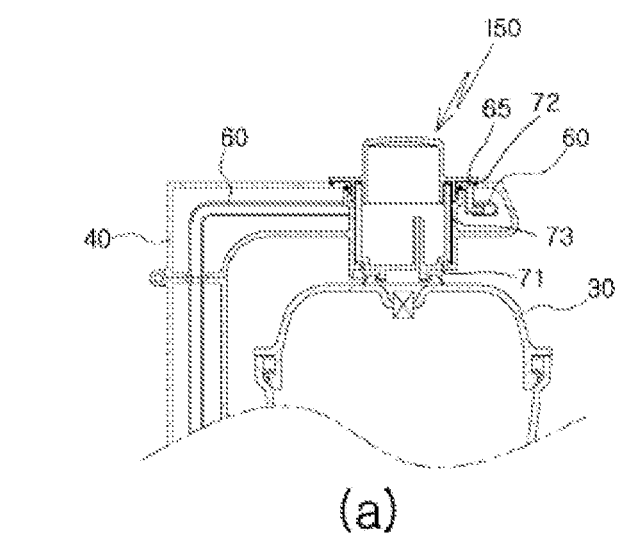
FIG. 13 is a structural cross-sectional view when the communication member of the vacuum blender according to the fifth embodiment of the present disclosure has been rotated.
Figure 13:
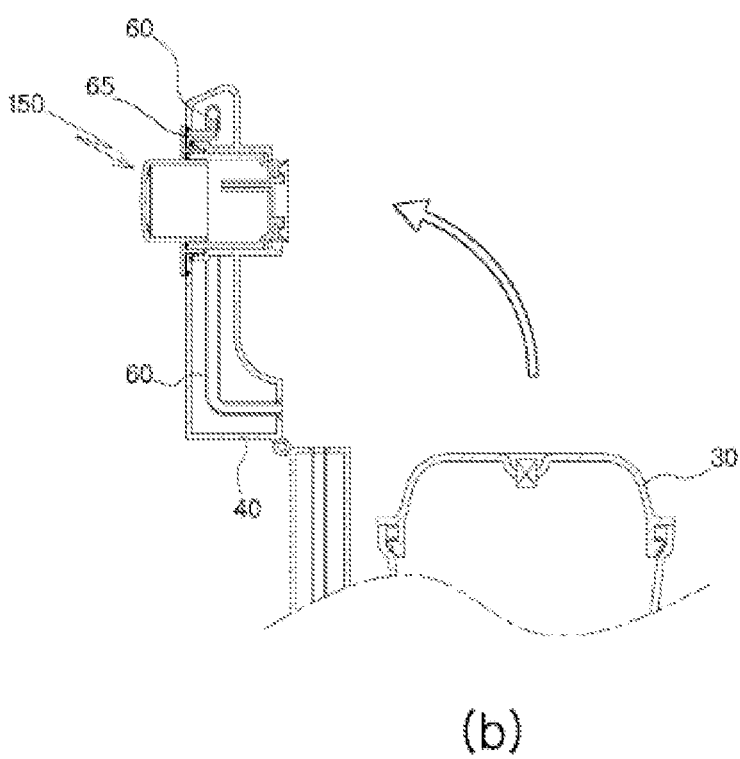

FIG. 9 is a structural cross-sectional view of a vacuum blender according to a fifth embodiment of the present disclosure, FIG. 10 is an enlarged view of the portion A of FIG. 9, FIG. 11 is a partial structural view when a foreign body catching member is moved up and down in FIG. 9, FIG. 12 is an exploded perspective view of the foreign body catching member and the communication member of the vacuum blender according to the fifth embodiment of the present disclosure, and FIG. 13 is a structural cross-sectional view when the communication member of the vacuum blender according to the fifth embodiment of the present disclosure is rotated.

A vacuum blender of the present disclosure, as shown in FIGS. 9 to 13, includes a body 10, a crushing container 20, a container cover 30, a communication member 40, a foreign body catching member 150, and a connection channel 60.

The body 10 is equipped with a motor 11, a vacuum pump 12, a pressure relief valve, etc.

The crushing container 20 is coupled to the body 10 and has a mixing space therein in which food is collected.

The container cover 30 is coupled to the upper portion of the crushing container 20, thereby covering the upper portion of the mixing space.

A discharge hole 31 that communicates the mixing space with the outside is formed through the container cover 30.

Further, a check valve is mounted in the discharge hole 31.

The communication member 40 has one end coupled to the body 10 and the other end disposed over the container cover 30.

The communication member 40 may be formed in various shapes other than the shape shown in the figures.

For example, the communication member 40 may be formed in a cover shape covering the entire or a portion of the crushing container 20.

A mount hole 42 is formed at the upper portion of the communication member 40.

The foreign body catching member 150, as shown in FIG. 11, is detachably coupled to the mount hole 42 of the communication member 40 outside rather than inside the container cover 30.

The foreign body catching member 150 has a chamber therein in which microparticles that are produced when food is crushed are collected through the discharge hole 31.

Several coupling protrusions 47 may protrude from the inner circumferential surface of the mount hole 42, and the outer circumferential surface of the foreign body catching member 150 is detachably coupled to the coupling protrusions 47.

Further, as shown in FIG. 10, a first communication hole 154 and a second communication hole 155 for communicating with the outside are formed at the foreign body catching member 150.

The first communication hole 154 is formed in the downward direction of the foreign body catching member 150 and the second communication hole 155 is formed in the lateral direction of the foreign body catching member 150.

In this embodiment, the foreign body catching member 150 is composed of, at the lower portion, a lower foreign body catching member part 151 at which the first communication hole 154 is formed and an upper foreign body catching member part 152 detachably coupled to the upper portion of the lower foreign body catching member part 151.

The first communication hole 154 is formed at the lower portion of the lower foreign body catching member part 151 and the second communication hole 155 is formed through the gap or a separate hole at the joint of the lower foreign body catching member part 151 and the upper foreign body catching member part 152.

A gasket is mounted at the joint of the lower foreign body catching member part 151 and the upper foreign body catching member part 152, a hole communicating the inside and the outside is formed at any one or more of the parts, and the hole forms the second communication hole 155.

The connection channel 60 is formed in the communication member 40 and has one end connected with the vacuum pump 12 and the other end communicating with the foreign body catching member 150 mounted in the mount hole 42.

In this embodiment, the other end 65 of the connection channel is exposed to the outside through the top of the communication member 40 at the outside of the mount hole 42.

As shown in FIG. 12, the other end of the connection channel 60 is open upward through the top of the communication member 40.

The connection channel 60 may be formed by only a tube or by a combination of a tube and an injection mold.

That is, the connection channel 60 has only to connect the vacuum pump 12 and the outside of the top of the communication member 40 to enable communicating.

In this case, a check valve, a lip seal, or the like is mounted at the other end 65 of the connection channel exposed to the outside, so it may be possible to install a specific member to prevent inflow of microparticles by blocking up the other end 65 of the connection channel without an external force being applied.

As shown in FIG. 10, when the foreign body catching member 150 is mounted in the mount hole 42, the first communication hole 154 communicates with the discharge hole 31 disposed at a lower portion and the second communication hole 155 communicates with the connection channel 60 exposed to the outside at the upper portion of the communication member 40.

Accordingly, the inside of the crushing container 20 communicates with the vacuum pump 12 through the discharge hole 31, the first communication hole 154, the chamber, the second communication hole 155, and the connection channel 60.

The other end 65 of the connection channel formed at the upper portion of the communication member 40 is open upward and exposed to the outside.

In the figures of this embodiment, the other end of the connection channel 60 is open upward from the communication member 40 through an injection mold.

Depending on cases, the other end 65 of the connection channel may be laterally formed at the upper portion of the communication member 40, and any form is possible as long as air passes through.

Further, a flange 153 protruding outward is formed at the foreign body catching member 150.

The flange 153 may protrude in only any one direction from the outer surface of the foreign body catching member 150, but, as in this embodiment, it is preferable that the flange 153 protrudes outward around the entire outer surface of the foreign substance collect 150.

When the foreign body catching member 150 is mounted in the mount hole 42, the flange 153 covers the other end 65 of the connection channel and the second communication hole 155 formed at the foreign body catching member 150 communicates with the other end 65 of the connection channel.

A lower gasket 71 is disposed between the lower portion of the foreign body catching member 150 and the inner surface of the lower portion of the mount hole 42, so when the foreign body catching member 150 is mounted in the mount hole 42, the lower gasket 71 seals the gap between the outer circumferential surface of the lower portion of the foreign body catching member 150 and the inner surface of the lower portion of the mount hole 42 from the outside.

The lower gasket 71 may further protrude downward to come in contact with the top of the crushing container 20.

Further, an upper gasket 72 is disposed in the gap between the upper portion of the foreign body catching member 150 and the upper portion of the communication member 40, so when the foreign body catching member 150 is mounted in the mount hole 42, the upper gasket 72 seals the gap between the outer circumferential surface of the upper portion of the foreign body catching member 150 and the upper portion of the communication member 40 from the outside.

In this embodiment, the upper gasket 72 is disposed between the flange 153 covering the upper portion of the communication member 40 and the top of the communication member 40 to block the communication between the other end 65 of the connection channel and the outside such that inflow/outflow of external air is prevented.

By the lower gasket 71 and the upper gasket 72, when the foreign body catching member 150 is mounted in the mount hole 42, a chamber channel 75 sealed from the outside is formed between the outer surface of the foreign body catching member 150 and the inner circumferential surface of the mount hole 42.

Of course, depending on cases, the chamber channel 75 may be formed in various ways including a structure sealed from the outside between the outer surface of the foreign body catching member 150 and the inner circumferential surface of the mount hole 42 by changing the positions, presence, or the like of the lower gasket 71 and the upper gasket 72.

The chamber channel 75 communicates with the second communication hole 155 and the other end 65 of the connection channel.

Accordingly, when the foreign body catching member 150 is mounted in the mount hole 42 and the flange 153 cover the other end of the connection channel 65, the other end of the connection channel 65, which is disposed at a lower portion of the flange 153, is blocked from the outside and communicates with the second communication hole 155 through the chamber channel 75.

As described above, the second communication hole 155 and the other end 65 of the connection channel may communicate while in direct contact with each other, but there may be a problem that when microparticles collected in the foreign body catching member 150 pass through the second communication hole 155, they directly move to the other end 65 of the connection channel.

However, in the present disclosure, the second communication hole 155 and the other end 65 of the connection channel do not communicate while in direct contact with each other and indirectly communicate through the sealed chamber channel 75 formed between the outer circumferential surface of the foreign body catching member 150 and the inner circumferential surface of the mount hole 42, so when the microparticles collected in the foreign body catching member 150 pass through the second communication hole 155, they move through the chamber channel 75 bending in a zigzag pattern in several direction, whereby it is possible to further prevent the microparticles from moving to the other end 65 of the connection channel and to prevent the microparticles flowing in the chamber channel 75 from moving to the other end 65 of the connection channel by holding them in the chamber channel 75.

Further, the gap of the chamber channel 75 has only to allow for airflow, so the gap may be formed very small, and in this case, there is an effect that it is possible to further prevent microparticles in a fluid state from moving through the chamber channel 75 with a small gap.

In addition, according to the present disclosure, since the second communication hole 155 and the other end 65 of the connection channel are connected through the ring-shaped chamber channel 75, the second communication hole 155 and the other end 65 of the connection channel can be communicated through the chamber channel 75 even though they are not exactly aligned in contact with each other, so it is easy to manufacture and assemble parts.

For better communication between the other end 65 of the connection channel and the second communication hole 155, a movement gap is defined between the bottom of the flange 153 and the top of the communication member 40 when the foreign body catching member 150 is mounted in the mount hole 42 and the flange 153 covers the other end 65 of the connection channel.

Accordingly, the other end 65 of the connection channel more easily communicates with the second communication hole 155 through the movement gap.

In this embodiment, a movement groove 156 concave upward is formed on the bottom of the flange 153, and the movement groove 156 forms the movement gap when the flange 153 covers the other end of the communication member 40.

The movement groove 156 is formed in a ring shape along the bottom of the flange 153 such that the movement groove 156 can communicate with the other end of the communication member 40 in any direction.

Depending on cases, the movement groove 156 may be such that the bottom of the flange 153 is concave downward on the top of the communication member 40.

Further, a hollow protrusion 157 is formed in the upward direction of the first communication hole 154 in the foreign body catching member 150.

The hollow protrusion 157 is made of a tube, etc., so it may be detachably mounted while the length thereof is changed in the foreign body catching member 150.

Microparticles flowing in the chamber through the first communication hole 154 and the hollow protrusion 157 are prevented from being discharged to the top of the container cover 30 or into the crushing container 20 through the first communication hole 154 by the height of the hollow protrusion 157.

Meanwhile, the communication member 40 may be mounted to be movable in the up-down direction with respect to the body 10 or may be mounted to be rotatable in the up-down direction on a hinge point.

In the figures of this embodiment, the communication member 40 is mounted to be rotatable in the up-down direction on a hinge point.

In this configuration, the second communication hole 155 formed at the foreign body catching member 150 is formed opposite to the hinge point with respect to a vertical center line of the foreign body catching member 150.

That is, the second communication hole 155 is formed not close to, but far from the hinge point.

Accordingly, as shown in FIG. 13, it is possible to prevent the microparticles collected in the foreign body catching member 150 from being directly discharged to the connection channel 60 through the second communication hole 155 when the communication member 40 is rotated upward.

If the second communication hole 155 is formed close to the hinge point, when the communication member 40 is rotated upward, the microparticles collected in the chamber of the foreign body catching member 150 flow into the connection channel 60 through the second communication hole 155 by gravity and consequently flow into the vacuum pump 12, which causes breakdown of the vacuum pump 12.

However, according to the present disclosure, since the second communication hole 155 is formed far from the hinge point, that is opposite to the hinge point with respect to the vertical center line of the foreign body catching member 150, it is possible to effectively prevent the microparticles collected in the chamber of the foreign body catching member 150 from flowing into the connection channel 60 through the second communication hole 155 even though the communication member 40 is rotated upward.

Further, when the hollow protrusion 157 is not provided in the foreign body catching member 150, in a structure configured such that the microparticles collected in the foreign body catching member 150 drop onto or into the crushing container 20 through the first communication hole 154, microparticles (remains) of food existing in the foreign body catching member 150 may be dropped and mixed with each other in the crushing container 20 when different kinds of food are crushed. Accordingly, when a user wants to crush different kinds of food, there is inconvenience that it is required to use the foreign body catching member 150 after cleaning every time.

However, according to the present disclosure, since the hollow protrusion 157 is formed and the second communication hole 155 is formed at a position far from the hinge point with respect to the vertical center line of the foreign body catching member 150, when different kinds of food are crushed, it is possible to prevent microparticles existing in the foreign body catching member 150 from dropping into the crushing container 20 even though the communication member 40 is rotated several times in the up-down direction to crush the different kinds of food if the microparticles (remains) existing in the foreign body catching member 150 are collected at a position lower than the upper end of the hollow protrusion 157.

Therefore, according to the present disclosure, even when crushing different kinds of food, a user only has to clean the foreign body catching member 150 when microparticles are collected at a predetermined level without cleaning the foreign body catching member 150 every time, so it is possible to provide convenience in cleaning, managing, etc. to a user.

When microparticles collected in the foreign body catching member 150 exist lower than the upper end of the hollow protrusion 157, it is possible to prevent the microparticles from being discharged to the second communication hole even when using the foreign body catching member 150 several times while rotating the communication member 40 in the up-down direction.

Further, it is preferable that the foreign body catching member 150 is made of a transparent material so that a user can easily visually check the amount of microparticles that are collected in the foreign body catching member 150.

As described above, according to the present disclosure, since the other end 65 of the connection channel is exposed to the outside through the top of the communication member 40 rather than the inside of the mount hole 42, the other end 65 of the connection channel is exposed well to the outside when the foreign body catching member 150 is separated from the mount hole 42 of the communication member 40, so it is possible to more easily clean the other end 65 of the connection channel and it is also possible to more easily check microparticles substances moving through the foreign body catching member 150 and the connection channel 60.

Further, it is possible to more effectively prevent microparticles flowing in the foreign body catching member 150 from flowing into the vacuum pump 12 through the connection channel 60 using the vacuum chamber 75.

By this structure, microparticles that are produced when food is crushed are collected into the foreign body catching member 150 in the present disclosure, so it is possible to prevent microparticles from flowing into the vacuum pump 12.

Further, since the foreign body catching member 150 collects microparticles, there is no problem even when vacuum operation and crushing operation are simultaneously performed, whereby it is possible to remarkably reduce the operation time of the vacuum blender.

In addition, since the foreign body catching member 150 is attachable and detachable to and from the communication member 40 in the present disclosure, it is easy to wash and clean the foreign body catching member 150.

Further, since the other end 65 of the connection channel that communicates with the second communication hole 155 of the foreign body catching member 150 is exposed to the outside at the upper portion of the communication member 40, cleaning, etc. are further easy.

Meanwhile, a blocking plate 158 protruding downward from above is formed in the foreign body catching member 150.

In this embodiment, the blocking plate 158 protrudes downward from above in the upper foreign body catching member part 152.

The blocking plate 158 protrudes downward further than the upper end of the lower foreign body catching member part 151, and protrudes further downward than the second communication hole 155 when disposed close to the second communication hole 155.

By forming the blocking plate 158 as such, it is possible to further prevent microparticles collected in the foreign body catching member 150 from flowing into the second communication hole 155 due to a vacuum suction force.

Sixth Embodiment

Figure 14:
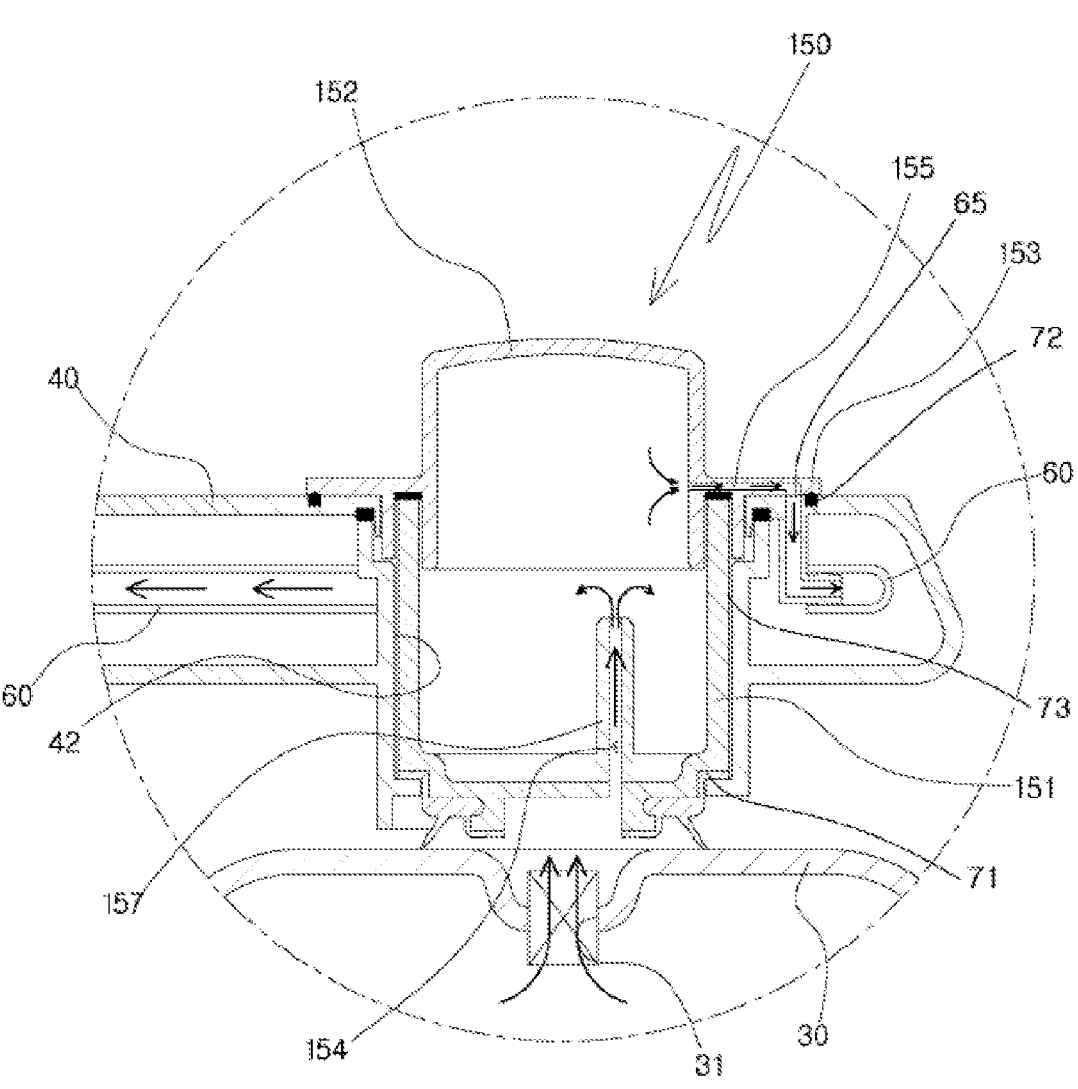
FIG. 14 is a structural cross-sectional view showing a main connection structure of the foreign body catching member and the communication member of a vacuum blender according to a sixth embodiment of the present disclosure.

FIG. 14 is a structural cross-sectional view showing the main connection structure of the foreign body catching member 150 and the communication member 40 of a vacuum blender according to a sixth embodiment.

The sixth embodiment is different from the fifth embodiment in the second communication hole 155, so this is mainly described.

The second communication hole 155 is formed through the side of the foreign body catching member 150.

When the foreign body catching member 150 is mounted in the mount hole 42 and the flange 153 covers the other end 65 of the connection channel, the other end 65 of the connection channel communicates with the second communication hole 155 formed through the side of the foreign body catching member 150.

The other configurations are the same as or similar to those of the fifth embodiment, so they are not described in detail.

Seventh Embodiment

Figure 15:
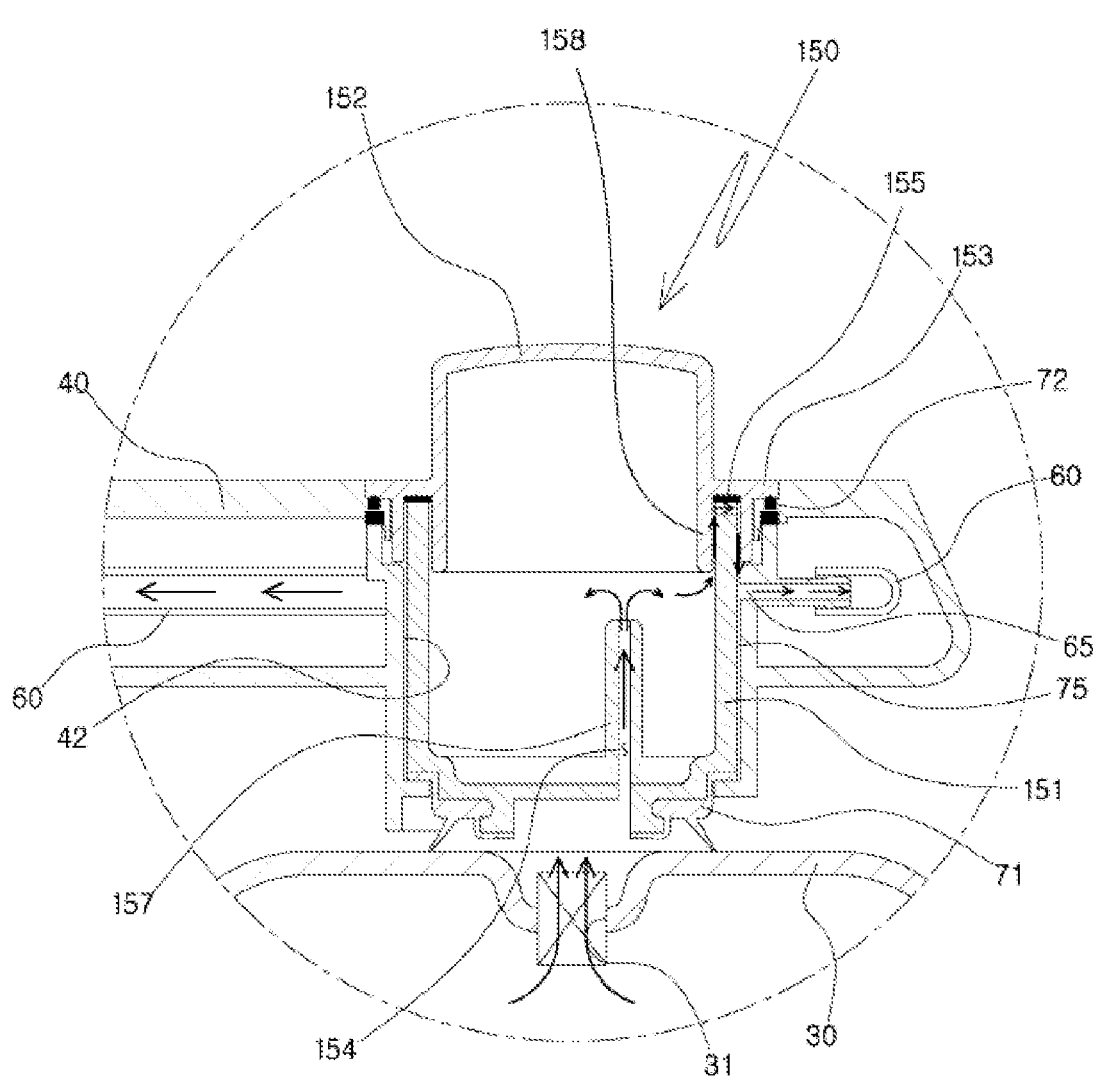
FIG. 15 is a structural cross-sectional view showing a main communication structure of the foreign body catching member and the communication member of a vacuum blender according to a seventh embodiment of the present disclosure.

FIG. 15 is a structural cross-sectional view showing a main connection structure of the foreign body catching member and the communication member of a vacuum blender according to a seventh embodiment of the present disclosure.

The seventh embodiment is different from the fifth embodiment in the position of the upper gasket 72 and the position of the other end 65 of the connection channel, so this is mainly described.

In this embodiment, the upper gasket 72 is disposed between the upper portion of the foreign body catching member 150 and the inner surface of the upper portion of the mount hole 42 to seal the gap therebetween.

In this configuration, the upper portion of the foreign body catching member 150 may be various positions, and preferably, it is the bottom of the flange 153, as shown in the figure of this embodiment.

Accordingly, in this embodiment, the upper gasket 72 is disposed for sealing between the bottom of the flange 153 and the inner surface of the upper portion of the mount hole 42, whereby the chamber channel 75 is formed.

Depending on cases, the upper gasket 72 may be disposed between the bottom of the flange 153 and the top of the communication member 40 with the upper portion of the foreign body catching member 150, that is, the bottom of the flange 153 covering the top of the communication member 40.

Further, the other end 65 of the connection channel is open toward the mount hole 42.

Accordingly, the second communication hole 155 is communicated with the other end 65 of the connection channel laterally formed in the mount hole 42 through the chamber channel 75.

The other configurations are the same as or similar to those of the fifth embodiment, so they are not described in detail.

A vacuum blender having a foreign body catching member mounted thereon and a foreign body catching member for a vacuum blender of the present disclosure is not limited to the embodiments described above and may be modified in various ways within the allowable range of the spirit of the present disclosure.

INDUSTRIAL APPLICABILITY

Since the present disclosure can be applied to a vacuum blender, it has industrial applicability.

The invention claimed is:

1. A vacuum blender having a foreign body catching member mounted thereon, the vacuum blender comprising:
    a body equipped with a motor and a vacuum pump;
    a crushing container coupled to the body and having a mixing space therein in which food is received;
    a container cover coupled to an upper portion of the crushing container, covering an upper portion of the mixing space, and having a discharge hole formed therethrough;
    a communication path enabling the vacuum pump and the discharge hole of the container cover to communicate with each other;
    a foreign body catching member having one end communicating with the discharge hole and the other end communicating with the communication path, and having a chamber therein in which microparticles that are produced when food is crushed are collected through the discharge hole; and
    a communication member having one end coupled to the body and the other end disposed outside the container cover,
    wherein the foreign body catching member is disposed outside the container cover,
    when the vacuum pump is operated in a state where the one end and the other end of the foreign body catching member are communicating with the discharge hole and the communication path, respectively, air in the mixing space is discharged to the outside by passing through the vacuum pump via the discharge hole, the foreign body catching member, and the communication path,
    a hollow protrusion communicating with the discharge hole protrudes upward from a bottom inside the foreign body catching member,
    an upper end of the hollow protrusion protruding upward is open to the chamber,
    the microparticles flowing into the chamber through the hollow protrusion are accumulated between the outer circumferential surface of the hollow protrusion and the inner surface of the foreign body catching member due to the height of the hollow protrusion, and are thus prevented from flowing out into the inside of the crushing container through the inside of the hollow protrusion, the communication path is formed in the communication member, a mount hole is formed at the communication member, the foreign body catching member is coupled to be movable in an up-down direction in the mount hole, and when the foreign body catching member is coupled to the communication member, the one end of the foreign body catching member communicates with the discharge hole and the other end of the foreign body catching member communicates with the communication path when the foreign body catching member is moved down, and the one end of the foreign body catching member is separated from the discharge hole to block the communication and the other end of the foreign body catching member is separated from the communication path to block the communication when the foreign body catching member is moved up.

2. The vacuum blender of claim 1, wherein a hollow-shape elastic member is mounted between an upper portion of the container cover and a lower portion of the foreign body catching member, and when the foreign body catching member is moved down, an upper end of the elastic member is in contact with the one end formed at a lower portion of the foreign body catching member and a lower end of the elastic member is in contact with an upper end of the container body around the discharge hole, thereby sealing the discharge hole from the outside.

3. The vacuum blender of claim 1, wherein the communication member is mounted to be rotatable in the up-down direction with respect to the body, a hollow-shape elastic member is mounted at a lower portion of the other end of the communication member, and when the communication member is moved down, a lower end of the elastic member comes in contact with an upper end of the container cover, thereby sealing the discharge hole from the outside.

4. The vacuum blender of claim 1, wherein a transparent window is formed at the communication member at which the foreign body catching member is mounted, so a user can check microparticles collected in the foreign body catching member through the transparent window.

5. The vacuum blender of claim 1, wherein the communication member is formed in a cover blocking an outer circumferential surface of the crushing container from the outside by covering the crushing container and the container cover, the mount hole at which the foreign body catching member is detachably mounted is formed at the communication member formed in a cover shape, a through-hole communicating with the discharge hole is formed in the mount hole, and when the foreign body catching member is mounted in the mount hole, the one end of the foreign body catching member communicates with the discharge hole via the through-hole and the other end of the foreign body catching member communicates with the communication path formed in the communication member.

6. The vacuum blender of claim 1, wherein a blocking plate protruding downward from above is formed in the foreign body catching member, and a lower end of the blocking plate is positioned lower than the upper end of the hollow protrusion.

7. The vacuum blender of claim 1, wherein the communication member having the foreign body catching member mounted thereon is mounted to be rotatable on a hinge point in an up-down direction with respect to the body, and the other end, formed in a lateral direction of the foreign body catching member to communicate with the communication path, of the foreign body catching member is formed opposite to the hinge point with respect to a vertical center line of the foreign body catching member.

8. The vacuum blender of claim 1, wherein the foreign body catching member is detachably coupled to the mount hole of the communication member and has a first communication hole and a second communication hole for communicating the inside of the foreign body catching member and the outside of the foreign body catching member, respectively, the first communication hole is formed in a downward direction of the foreign body catching member and the second communication hole is formed in a lateral direction of the foreign body catching member, the hollow protrusion protrudes in an upward direction of the first communication hole, the communication path is a connection channel formed in the communication member and having one end connected with the vacuum pump and the other end being open upward and exposed to the outside through a top of the communication member outside the mount hole, and when the foreign body catching member is mounted in the mount hole, the first communication hole communicates with the discharge hole disposed at a lower portion, and the second communication hole communicates with the other end of the connection channel, which is exposed to the outside at an upper portion of the communication member when the other end of the connection channel is covered.

9. The vacuum blender of claim 8, wherein a flange protruding outward is formed on the foreign body catching member, and when the foreign body catching member is mounted in the mount hole, the flange covers the other end of the connection channel and the second communication hole formed at the foreign body catching member communicates with the other end of the connection channel.

10. The vacuum blender of claim 9, wherein the foreign body catching member includes:

a lower foreign body catching member part having the first communication hole formed at a lower portion thereof; and an upper foreign body catching member part detachably coupled to an upper portion of the lower foreign body catching member part, the second communication hole is formed through a gap at a joint of the lower foreign body catching member part and the upper foreign body catching member part, and when the foreign body catching member is mounted in the mount hole and the flange covers the other end of the connection channel, the other end of the connection channel communicates with the second communication hole.

11. The vacuum blender of claim 10, wherein when the foreign body catching member is mounted in the mount hole and the flange covers the other end of the connection channel, a movement gap is formed between a bottom of the flange and a top of the communication member, and the other end of the connection channel communicates with the second communication hole through the movement gap.

12. The vacuum blender of claim 9, wherein the second communication hole is formed through a side of the foreign body catching member, and when the foreign body catching member is mounted in the mount hole and the flange covers the other end of the connection channel, the other end of the connection channel communicates with the second communication hole formed through the side of the foreign body catching member.

13. The vacuum blender of claim 1, wherein the foreign body catching member is detachably coupled to the mount hole of the communication member and has a first communication hole and a second communication hole for communicating the inside and the outside, respectively, the first communication hole is formed in a downward direction of the foreign body catching member and the second communication hole is formed in a lateral direction of the foreign body catching member, the communication path is a connection channel formed in the communication member and having one end connected with the vacuum pump and the other end communicating with the foreign body catching member mounted in the mount hole, and when the foreign body catching member is mounted in the mount hole, a chamber channel sealed from the outside is formed between an outer surface of the foreign body catching member and an inner circumferential surface of the mount hole, the first communication hole communicates with the discharge hole disposed at a lower portion, and the second communication hole communicates with the other end of the connection channel through the chamber channel.

14. The vacuum blender of claim 13, further comprising:

a lower gasket disposed between a lower portion of the foreign body catching member and an inner surface of a lower portion of the mount hole, thereby sealing a gap therebetween; and an upper gasket disposed between an upper portion of the foreign body catching member and an upper portion of the communication member or between the upper portion of the foreign body catching member and an inner surface of an upper portion of the mount hole, thereby sealing a gap therebetween, wherein when the foreign body catching member is mounted in the mount hole, the chamber channel sealed from the outside is formed between an outer surface of the foreign body catching member and an inner circumferential surface of the mount hole by the lower gasket and the upper gasket.

15. The vacuum blender of claim 13, wherein the other end of the connection channel is exposed to the outside through a top of the communication member at the outside of the mount hole, and the other end of the connection channel communicates with the second communication hole through the chamber channel when a portion of the foreign body catching member covers the other end of the connection channel.

16. The vacuum blender of claim 13, wherein the other end of the connection channel is open toward the mount hole and communicates with the second communication hole through the chamber channel.

17. The vacuum blender of claim 13, wherein the foreign body catching member includes:

a lower foreign body catching member part having the first communication hole formed at a lower portion thereof; and an upper foreign body catching member part detachably coupled to an upper portion of the lower foreign body catching member part, and the second communication hole is formed through a gap at a joint of the lower foreign body catching member part and the upper foreign body catching member part when the lower foreign body catching member part and the upper foreign body catching member part are combined.

18. A foreign body catching member for a vacuum blender, the foreign body catching member detachably mounted on the vacuum blender and receiving microparticles generated when crushing food received between a crushing container and a container cover, wherein the foreign body catching member is disposed outside the container cover coupled to an upper portion of the crushing container, and the foreign body catching member disposed outside the container cover comprises:

one end communicating with or blocked from a discharge hole formed at the container cover, a chamber receiving microparticles is formed in the foreign body catching member, a hollow protrusion communicating with the discharge hole and protruding upward from a bottom inside the foreign body catching member, wherein an upper end of the hollow protrusion protruding upward is open to the chamber, and the microparticles flowing into the chamber through the hollow protrusion are accumulated between the outer circumferential surface of the hollow protrusion and the inner surface of the foreign body catching member due to the height of the hollow protrusion, and are thus prevented from flowing out into the inside of the crushing container through the inside of the hollow protrusion.

* * * * *